(12) United States Patent
Bargmann

(10) Patent No.: US 11,182,068 B2
(45) Date of Patent: Nov. 23, 2021

(54) METHOD AND SYSTEM FOR INTERACTING WITH A TOUCH SCREEN

(71) Applicant: VERIZON MEDIA INC., New York, NY (US)

(72) Inventor: Jeff Bargmann, San Francisco, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 641 days.

(21) Appl. No.: 14/983,762

(22) Filed: Dec. 30, 2015

(65) Prior Publication Data

US 2017/0115867 A1    Apr. 27, 2017

Related U.S. Application Data

(60) Provisional application No. 62/246,984, filed on Oct. 27, 2015.

(51) Int. Cl.
*G06F 3/0488* (2013.01)
*G06F 3/0482* (2013.01)
(Continued)

(52) U.S. Cl.
CPC ........ *G06F 3/04883* (2013.01); *G06F 3/0482* (2013.01); *G06F 3/0485* (2013.01); *G06F 3/04842* (2013.01)

(58) Field of Classification Search
CPC ..................... G06F 3/016; G06F 3/017; G06F 3/041–0418; G06F 3/048–04897; G06F 2203/04105
See application file for complete search history.

(56) References Cited

U.S. PATENT DOCUMENTS 5,880,411 A * 3/1999 Gillespie ............. G06F 3/03547
178/18.01
6,597,347 B1 * 7/2003 Yasutake ............... G06F 3/0338
178/18.01
(Continued)

OTHER PUBLICATIONS

Bohn,D., "Here's what 3D Touch can do on the iPhone 6S," Sep. 22, 2015, https://web.archive.org/web/20151026061049/https://www.theverge.com/2015/9/22/9370739/3d-touch-features-iphone-6s (Year: 2015).*

*Primary Examiner* — Tadesse Hailu
*Assistant Examiner* — Alvaro R Calderon, IV
(74) *Attorney, Agent, or Firm* — James J. DeCarlo; Greenberg Traurig LLP

(57) ABSTRACT

Disclosed is a system, method, and non-transitory computer readable storage medium for monitoring a user interface for a gesture, determining whether the gesture is exerting pressure on a screen of a computing device, when the gesture is exerting pressure on the screen, determining whether the pressure is above a threshold amount of pressure, when the pressure is above the threshold, previewing a content item in a series of content items, monitoring the user interface for a second gesture, determining whether the second gesture is traversing pixels in a predetermined direction on the screen, upon determining that the second gesture is traversing pixels, further determining whether the traversal meets a threshold number of traversed pixels, and when the traversal meets the threshold, displaying a subsequent content item in the series.

7 Claims, 21 Drawing Sheets

(51) Int. Cl.
*G06F 3/0485* (2013.01)
*G06F 3/0484* (2013.01)

(56) References Cited

U.S. PATENT DOCUMENTS

| | | | | |
|---|---|---|---|---|
| 7,474,772 B2* | 1/2009 | Russo | G06F 3/033 | 345/157 |
| 7,532,205 B2* | 5/2009 | Gillespie | G06F 3/03547 | 178/18.01 |
| RE40,891 E * | 9/2009 | Yasutake | G06F 3/0338 | 178/18.01 |
| 8,159,455 B2* | 4/2012 | Leung | G01C 9/00 | 345/156 |
| 8,436,821 B1* | 5/2013 | Plichta | G06F 3/04883 | 345/156 |
| 8,479,122 B2* | 7/2013 | Hotelling | G06F 3/0418 | 715/767 |
| 9,244,562 B1* | 1/2016 | Rosenberg | G06F 3/04847 | |
| 9,740,396 B1* | 8/2017 | Ahaus | G06F 3/04886 | |
| 9,830,048 B2* | 11/2017 | Dakin | G06F 3/0482 | |
| 9,910,494 B2* | 3/2018 | Westerman | G06F 3/016 | |
| 2007/0268275 A1* | 11/2007 | Westerman | G06F 3/0235 | 345/173 |
| 2008/0088602 A1* | 4/2008 | Hotelling | G06F 1/1626 | 345/173 |
| 2008/0155475 A1* | 6/2008 | Duhig | G06F 3/0482 | 715/830 |
| 2009/0273563 A1* | 11/2009 | Pryor | B60K 35/00 | 345/157 |
| 2009/0288044 A1* | 11/2009 | Matthews | G06F 3/0482 | 715/863 |
| 2009/0289902 A1* | 11/2009 | Carlvik | G06F 3/04883 | 345/173 |
| 2010/0044121 A1* | 2/2010 | Simon | G06F 3/03547 | 178/18.03 |
| 2010/0128002 A1* | 5/2010 | Stacy | G06F 3/016 | 345/174 |
| 2011/0016390 A1* | 1/2011 | Oh | G06F 3/0482 | 715/702 |
| 2011/0175832 A1* | 7/2011 | Miyazawa | G06F 3/041 | 345/173 |
| 2012/0105367 A1* | 5/2012 | Son | G06F 3/0414 | 345/174 |
| 2012/0235912 A1* | 9/2012 | Laubach | G06F 3/04895 | 345/163 |
| 2012/0274609 A1* | 11/2012 | Sheng | G06F 3/0418 | 345/177 |
| 2012/0317521 A1* | 12/2012 | Ludwig | G06F 3/04883 | 715/863 |
| 2013/0082916 A1* | 4/2013 | Dixit | G06F 3/011 | 345/156 |
| 2013/0141364 A1* | 6/2013 | Lynn | G06F 3/041 | 345/173 |
| 2013/0141365 A1* | 6/2013 | Lynn | G06F 3/041 | 345/173 |
| 2013/0169546 A1* | 7/2013 | Thomas | G06F 9/4451 | 345/173 |
| 2013/0311886 A1 | 11/2013 | Ku et al. | | |
| 2014/0019917 A1* | 1/2014 | Piemonte | G06F 3/017 | 715/848 |
| 2014/0292396 A1* | 10/2014 | Bruwer | H03K 17/955 | 327/517 |
| 2014/0317492 A1* | 10/2014 | Kwak | G06F 3/0488 | 715/234 |
| 2014/0320434 A1* | 10/2014 | Pantel | G06F 3/04883 | 345/173 |
| 2015/0022558 A1* | 1/2015 | Li | G06F 1/1694 | 345/650 |
| 2015/0062052 A1* | 3/2015 | Bernstein | G06F 3/0416 | 345/173 |
| 2015/0067496 A1* | 3/2015 | Missig | G06F 3/016 | 715/702 |
| 2015/0067559 A1* | 3/2015 | Missig | G06F 3/04845 | 715/765 |
| 2015/0067560 A1* | 3/2015 | Cieplinski | G06F 3/04883 | 715/765 |
| 2015/0067596 A1* | 3/2015 | Brown | G06F 3/0416 | 715/808 |
| 2015/0116205 A1* | 4/2015 | Westerman | G06F 3/016 | 345/156 |
| 2015/0128031 A1* | 5/2015 | Lee | G06F 3/04883 | 715/238 |
| 2015/0355716 A1* | 12/2015 | Balasubramanian | G06F 3/04883 | 345/173 |
| 2016/0004427 A1* | 1/2016 | Zambetti | G06F 3/0488 | 715/802 |
| 2016/0034133 A1* | 2/2016 | Wilson | G06F 3/0488 | 715/772 |
| 2016/0034166 A1* | 2/2016 | Wilson | G06F 3/04842 | 715/771 |
| 2016/0188181 A1* | 6/2016 | Smith | G06F 3/0416 | 715/765 |
| 2016/0259497 A1* | 9/2016 | Foss | G06F 3/0482 | |
| 2016/0259518 A1* | 9/2016 | King | G06F 3/0482 | |
| 2016/0259528 A1* | 9/2016 | Foss | G06F 3/0482 | |
| 2016/0274686 A1* | 9/2016 | Alonso Ruiz | G06F 3/03547 | |
| 2016/0291731 A1* | 10/2016 | Liu | G06F 1/1656 | |
| 2016/0357390 A1* | 12/2016 | Federighi | G06F 3/04815 | |
| 2016/0360116 A1* | 12/2016 | Penha | G06F 3/0487 | |
| 2016/0371917 A1* | 12/2016 | Yang | G07F 17/3204 | |
| 2017/0046024 A1* | 2/2017 | Dascola | H04M 1/72522 | |
| 2017/0060315 A1* | 3/2017 | Park | G06F 3/0482 | |
| 2017/0068371 A1* | 3/2017 | Fleizach | G06F 3/0488 | |
| 2017/0083145 A1* | 3/2017 | Ichikawa | G06F 3/04883 | |
| 2017/0090731 A1* | 3/2017 | Wagatsuma | G06F 3/04883 | |

* cited by examiner

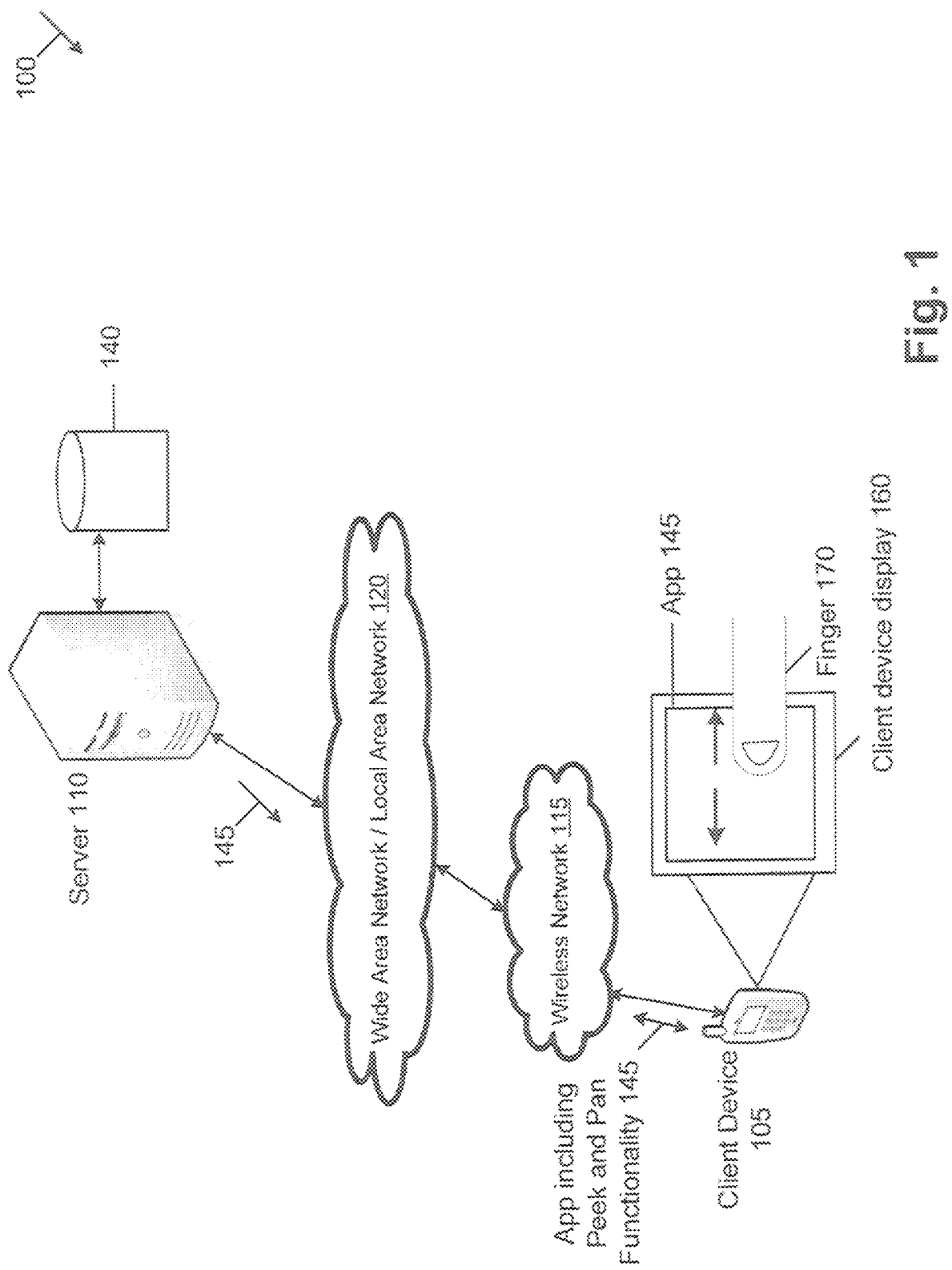

METHOD AND SYSTEM FOR INTERACTING WITH A TOUCH SCREEN

CROSS-REFERENCE TO RELATED APPLICATIONS

This application claims the benefit of U.S. Provisional Application Ser. No. 62/246,984, filed on Oct. 27, 2015, which is hereby incorporated by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates to a method and system for interacting with content on a touch screen, and more specifically to a method and system for interacting with content after exerting pressure on the touch screen.

BACKGROUND

Mobile devices, web sites and applications ("apps") have evolved over the years. For example, mobile devices such as laptops and phones may now be able to detect when pressure is exerted on their screens. The user's exertion of pressure on the screen while viewing an app or web site can change the functionality of the app or web site that the user is interacting with.

For example, some mobile devices (e.g., iPhone® 6s, developed by Apple Inc.®) enable a user to exert pressure on the touch screen of the mobile device to change the user interaction with the app or web site being viewed or interacted with. On the iPhone® 6s, this functionality is referred to as 3D Touch™. 3D Touch™ enables functionality such as "Peek and Pop", which let the user preview content without having to open the content. For example, with a light press on the touch screen, a user can preview each email in the user's inbox (i.e., "Peek" at an email). The preview is displayed until the user no longer exerts pressure on the screen. Thus, if the user does not want to do more than preview the message, the user stops exerting pressure on the touch screen and is back in the user's inbox. When the user wants to open an email that the user previewed, the user exerts additional pressure (i.e., presses a little "deeper") to open the email in full view (similar to if the user tapped to open the email from the user's inbox) (i.e., "Pop into it").

Similarly, a user can view digital photographs (or web pages) with Peek and Pop. For example, if the user presses lightly on a thumbnail image, the thumbnail image appears as a preview. If the user decides he wants to open or view the photograph, the user presses his or her touch screen by exerting additional pressure to display the photograph (i.e., "Pop into it").

SUMMARY

Using 3D Touch™ functionality, when a user previews a photograph (or other content items), the user can preview the photograph (or other content items) on a one-by-one basis. When the user moves his finger left and right, there is no effect (e.g., in the native iOS photos app). While pressure sensing interaction such as 3D Touch is useful in instances, users interacting with content on a device typically want to see more than a single item during interaction applications, and will wish to scroll through a photo stream, content timeline, or inbox items, or message conversations (as non-limiting examples) to see a number of items in a sequence sequentially in a direction, or go back and forward in a stream, or even jump forward or back in a stream or grouping quickly. The present disclosure presents a solution that improves touch screen interactions with device content by not only utilizing pressure to initiate content viewing but also pressure plus movement (e.g. by detecting pixel traversal) to initiate a directional scroll function. This speeds user interaction and selection of content in applications that use or can use the pressure sensing functionality of touch screen devices.

In one aspect, a method and computing device (i.e., processor) monitor, by the processor, a user interface for a gesture; determine, by the processor, whether the gesture is exerting pressure on a screen of the computing device; when the gesture is exerting pressure on the screen, determine, by the processor, whether the pressure is above a threshold amount of pressure; when the pressure is above the threshold, preview, by the processor, a content item in a series of content items; monitor, by the processor, the user interface for a second gesture; determine, by the processor, whether the second gesture is traversing pixels in a predetermined direction (e.g., left or right, up or down, at angles, or other directions recognized in accordance with the disclosure herein) on the screen; upon determining that the second gesture is traversing pixels, further determine whether the traversal meets a threshold number of traversed pixels; and when the traversal meets the threshold, displaying a subsequent content item in the series.

In one embodiment, the computing device monitors, by the processor, the user interface for a subsequent gesture; determines, by the processor, whether the subsequent gesture is traversing pixels in a predetermined direction on the screen; when the subsequent gesture is traversing, determines, by the processor, whether the traversal of pixels meets a subsequent threshold number of pixels; and when the traversal meets the subsequent threshold, displays, by the processor, a subsequent content item in the series.

In one embodiment, the threshold can change. For example, when the traversal meets a further traversal threshold, a further subsequent content item can be displayed. In one embodiment, a speed of traversal is determined and, in response to the speed, the speed of display of the subsequent display is controlled. The content items may be photographs, images, email strings, text messages, tweets, videos, notes, web pages, blog entries, screens, online comments, a feed, event timelines, and/or media items.

The subsequent threshold may be greater than or less than the threshold.

In one embodiment, a third gesture on the user interface is determined, where the third gesture is traversing pixels in a direction at an angle to the predetermined direction (e.g. perpendicular to the predetermined direction). The processor can determine that the traversing of the pixels at an angle to the predetermined direction is greater than an angular traversal threshold, and when the traversing is above the angular direction threshold, the processor can increase the value of the threshold so that it takes additional traversal in the predetermined direction to trigger the display of the subsequent content item. Thus, for example, when the user is trying to move his or her finger out of the way by moving his or her finger in an upwards direction or at an angle, the threshold to move to the next content item may increase.

In another aspect, a processor determines that an app is in a selection mode. The processor can display in a user interface of the app a preview of a content item in a series of content items. The processor can monitor the user interface for a gesture, and can determine whether the gesture is exerting pressure on a screen of the computing device. When the gesture is exerting pressure on the screen, the processor can determine whether the pressure is above a selection threshold amount of pressure. When the pressure is above the selection threshold, the processor can select the content item in the series. In one embodiment, an animation is played to denote selection of the content item.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 1 is a schematic diagram illustrating an example system of a network and devices implementing embodiments of the present disclosure;

DESCRIPTION OF EMBODIMENTS

Figure 2A:
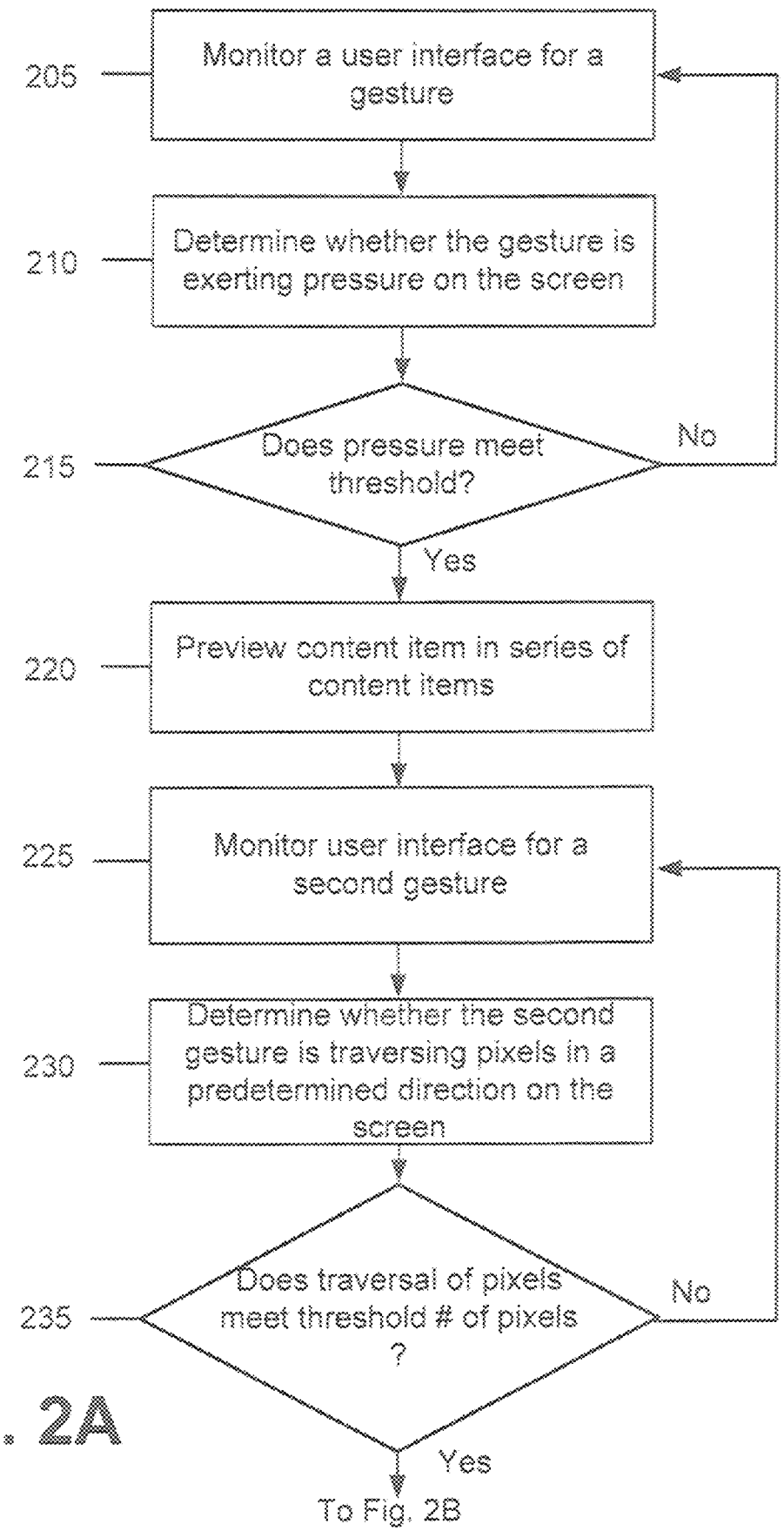
FIGS. 2A-2B are flowcharts illustrating steps performed by the client device of FIG. 1 in accordance with an embodiment of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered subject matter is intended to be construed as not being limited to any example embodiments set forth herein; example embodiments are provided merely to be illustrative. Likewise, a reasonably broad scope for covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the disclosure, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure, a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Disclosed subject matter is intended to cover a wide range of potential variations. For example, a simple smart phone, phablet or tablet may include a numeric keypad or a display. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that disclosed subject matter is intended to include a wide range of possible features or capabilities.

FIG. 1 is a block diagram illustrating an example system 100 including a client device 105 in communication with a server 110. The communications between the server 110 and the client device 105 can occur over a wireless network 115 connected to a local area network (LAN)/wide area network (WAN) 120, such as the Internet.

The client device 105 may be any computing device with a touch screen that can recognize the exertion of pressure on the screen. Other embodiments that may vary, for example, in terms of arrangement or in terms of type of components, are also intended to be included within disclosed subject matter. Although shown as a wireless network 115 (and WAN/LAN 120), the client device 105 can communicate with server 110 via any type of network. The server 110 is in communication with a database 140.

In one embodiment, the server 110 provides an app 145 which includes Peek and Pan functionality, as described below. The app 145 can be downloaded by the client device 105 from the server 110 or from an app store, such as Apple®'s App Store® or Google® Play®. The app 145 may be, for example, a messaging app, an email app, a social networking app (e.g., Twitter®, Facebook®, LinkedIn®, Flickr®, Google+®, Instagram™, etc.), a photo app (e.g., Flickr®, Instagram™), etc. The client device 105 downloads the app 145 and the user of the client device 105 launches the app 145. When the user launches the app 145, the user can display a photo on the client device display 160.

The description below may focus on a photo app, such as Flickr®. Nonetheless, as described in more detail below, the content can be other content besides digital photographs such as email strings, messaging conversations, event timelines, video frames, or other media items, and the app 145 can be other photo, messaging or mail applications or "apps" or may be included as part of an operating system (e.g., iOS 9 or Windows or the Android mobile operating system).

Normally, by pressing firmly on a photo (for example), the user can preview photos on a one-by-one basis (e.g., using 3D Touch™ functionality). When the user moves his finger (or other pointing device, such as a stylus) on the screen horizontally (left or right), there is no effect.

As used herein the terms horizontal or vertical are intended to indicate a user moving a finger or stylus up or down or side to side on a device screen, as viewed or experienced by the user during interaction, and is not intended to indicate that any particular physical device orientation is required for operation. The disclosure herein is intended to cover interfaces that can auto-rotate as a user turns a device, and also to cover variations in directions of detected movement, and not be limited to any precise orientation relative to the actual physical earth horizon or vertical direction normal thereto. The present disclosure, while using terms of convenience like horizontal or vertical or side-to-side or up and down, is intended to cover the detection of movement in predetermined directions on a device screen, regardless of the screen's absolute orientation in physical space or the axes of such directional movement.

In one embodiment, as disclosed herein, when the user previews a photo (e.g., Peek) and moves his finger 170 or other pointing device in a predetermined direction (e.g., horizontally left or right) (e.g., Pan), the app 145 changes the photo to a subsequent photo (e.g., left or right adjacent photo, depending on the movement of the user's pointing device or finger) to allow the user to efficiently scan the series of photos and determine the "best" photo from the series. The "best" photo may be based on one or more user preferences, may be a photo liked by the user, may be the clearest or sharpest photo in the series, or any other subjective or objective criteria that can be used to single out a photo in a series.

One embodiment of client device 105 is described in more detail below. Generally, however, client device 105 may include virtually any portable computing device capable of receiving and sending a message over a network, such as network 115, 120, wireless network 115, or the like. Thus, client device 105 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like.

A web-enabled client device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Client device 105 also may include at least one client application that is configured to receive content from another computing device. The client application, or "app", may include a capability to provide and receive textual content, graphical content, audio content, and the like. The client application may further provide information that identifies itself, including a type, capability, name, and the like. In one embodiment, client device 105 may uniquely identify itself through any of a variety of mechanisms, including a phone number, Mobile Identification Number (MIN), an electronic serial number (ESN), or other mobile device identifier.

In some embodiments, client device 105 may also communicate with non-mobile devices, such as server 110 or another client device, or the like. In one embodiment, such communications may include sending and/or receiving messages, searching for, viewing and/or sharing photographs, audio clips, video clips, or any of a variety of other forms of communications.

Wireless network 115 is configured to couple client device 105 and its components with network 120. Wireless network 115 may include any of a variety of wireless sub-networks that may further overlay stand-alone ad-hoc networks, and the like, to provide an infrastructure-oriented connection for client device 105. Such sub-networks may include mesh networks, Wireless LAN (WLAN) networks, cellular networks, and the like.

Network 120 is configured to couple server 110, or the like, with other computing devices, including, through wireless network 115, client device 105. Network 120 is enabled to employ any form of computer readable media for communicating information from one electronic device to another. Also, network 120 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communicate with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 115 and/or 120 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The server 110 may be a content server and include a device that includes a configuration to provide content via a network to another device. A content server 110 may, for example, host a site or service, such as streaming media site/service (e.g., Netflix®), an email platform or social networking site, or a personal user site (such as a blog, vlog, online dating site, and the like). A content server 110 may also host a variety of other sites, including, but not limited to business sites, educational sites, dictionary sites, encyclopedia sites, wikis, financial sites, government sites, and the like. Devices that may operate as content server 110 include personal computers, desktop computers, multiprocessor systems, microprocessor-based or programmable consumer electronics, network PCs, servers, and the like.

Content server 110 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via an application server, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

Further, server 110 may include or be in communication with an ad server to facilitate displaying of one or more advertisements (e.g., during the use of or downloading of the app 145). An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is, advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by server 110. This may include, in a non-limiting example, authentication servers, search servers, email servers, social networking services servers, SMS servers, IM servers, MMS servers, exchange servers, photo-sharing services servers, and travel services servers, via the network 120 using their various devices (e.g., client device 105). In some embodiments, applications, such as a streaming video application (e.g., Netflix®, Hulu®, iTunes®, Amazon Prime®, HBO Go®, and the like), blog, photo storage/sharing application or social networking application (e.g., Flickr®, Tumblr®, and the like), can be hosted by the server 110. Thus, the server 110 can store various types of applications and application related information including application data and user profile information (e.g., identifying and behavioral information associated with a user). It should also be understood that server 110 can also store various types of data related to the content and services provided by server 110 in an associated database 140. Embodiments exist where the network 120 is also coupled with/connected to a Trusted Search Server (TSS) which can be utilized to render content in accordance with the embodiments discussed herein. Embodiments exist where the TSS functionality can be embodied within server 110.

Moreover, although FIG. 1 illustrates server 110 as a single computing device, respectively, the disclosure is not so limited. For example, one or more functions of server 110 may be distributed across one or more distinct computing devices. Moreover, in one embodiment, the functions of server 110 may be integrated into a single computing device, without departing from the scope of the present disclosure.

FIG. 2A is a flow diagram of an embodiment of steps performed by the client device 105 to facilitate this Peek and Pan functionality of the app 145. As stated above, the client device 105 launches the app 145 and, in one embodiment, displays thumbnails of one or more photos. The client device 105 monitors a user interface displayed by the app 145 for a gesture (Step 205). When the client device 105 determines that a gesture has been performed on the user interface, the client device 105 determines whether the gesture is exerting pressure on the screen 160 of the client device 105 (Step 210).

The client device 105 then determines, in one embodiment, whether the pressure meets a predetermined threshold (Step 215). If the pressure does not meet the threshold in Step 215, the app 145 continues to display the thumbnails and returns to Step 205. If the pressure does meet the threshold in Step 215, the app 145 previews the content item (e.g., the photo in the thumbnail) (Step 220). The content item (photo) is one content item in a series of content items (e.g., a plurality of digital photographs).

Once the preview is displayed, the client device 105 then, in one embodiment, monitors the user interface for a second gesture (Step 225). The client device 105 then detects a second gesture and determines whether the second gesture is traversing a number of pixels in a predetermined direction (e.g., in a horizontal direction) on the screen 160 (Step 230). If so, the client device 105 determines whether the traversal of pixels meets a threshold number of traversed pixels (Step 235). If not, the app 145 continues to display the preview and returns to Step 225. If so, then the client device displays a subsequent content item (e.g., adjacent content item corresponding to the direction of the traversal) in the series, stream or timeline. Thus, in one embodiment, if the traversal was to the left, then the app 145 displays a subsequent content item (e.g., next photograph) in the series to the left. In one embodiment, if the traversal was to the right, then the app 145 displays the subsequent content item (e.g., next photograph to the right) in the series. In embodiments the speed of traversal can be determined (e.g. number of pixels over time) and the traversal speed can be used to control or influence the speed of the display of subsequent content items.

Figure 2B:
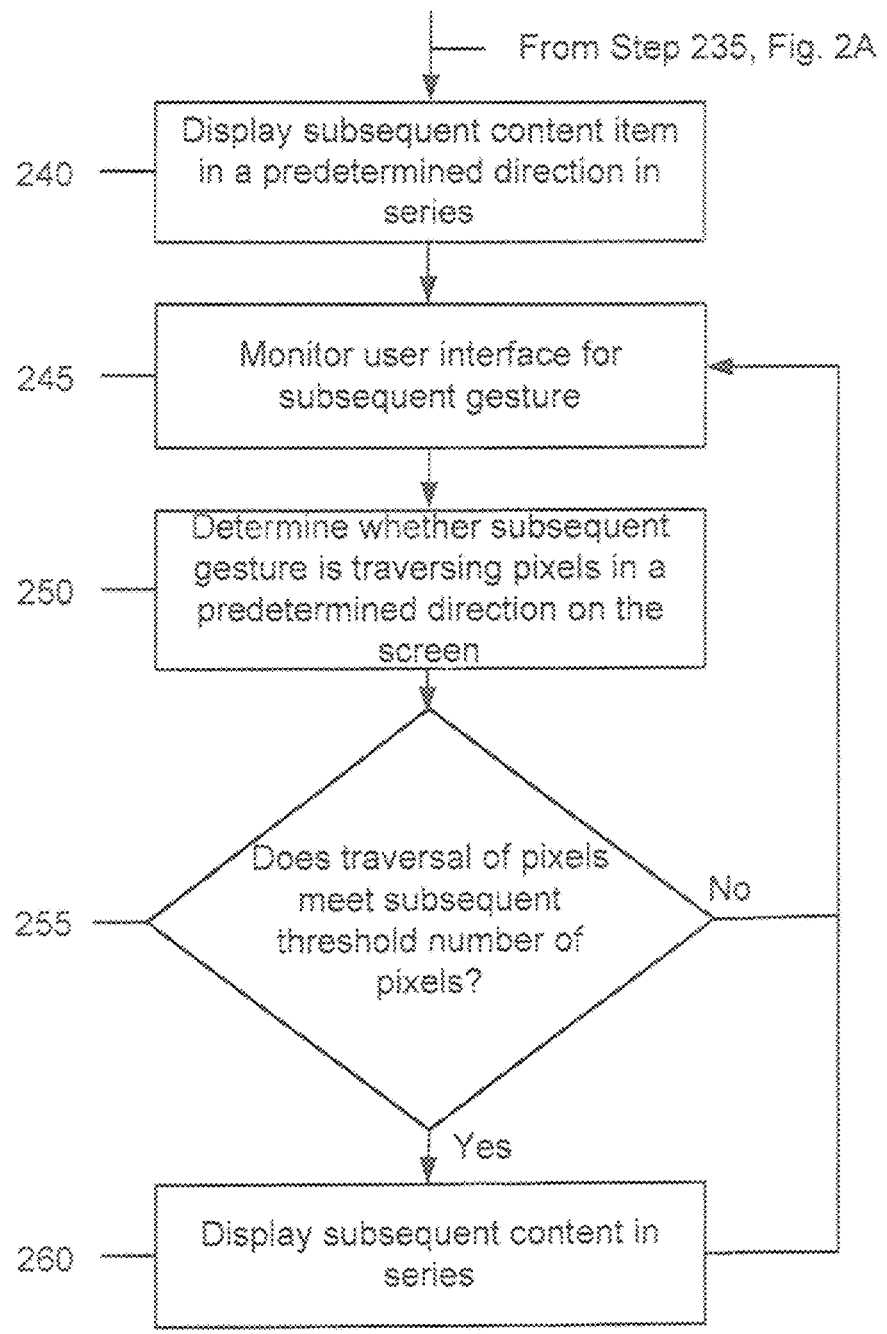

Continuing with FIG. 2B, in one embodiment the client device 105 then monitors the user interface for a subsequent gesture (Step 245). If the client device 105 detects a subsequent gesture, the client device 105 determines whether the subsequent gesture is a traversing of pixels (e.g., by the user's finger 170) in a predetermined direction (e.g., left or right) on the screen 160 (Step 250). In one embodiment, the client device 105 then determines whether the traversal of pixels meets a subsequent threshold number of pixels (Step 255). In one embodiment, the subsequent threshold number of pixels is less than the threshold number of pixels. In another embodiment, the subsequent threshold number of pixels is greater than the threshold number of pixels. In yet another embodiment, the threshold and the subsequent threshold are the same threshold.

In one embodiment, the threshold and/or the subsequent threshold are set or configured by the user. In another embodiment, the threshold and/or the subsequent threshold are set by the app 145, the client device 105, or the server 110.

If the traversal of the pixels does not meet the subsequent threshold, in one embodiment the app 145 continues to display the currently displayed content item and returns to Step 245. Alternatively, the app 145 can return to a preview of a content item and return to Step 205.

If the traversal of pixels meets the subsequent threshold number of pixels, the client device 105 displays a subsequent content item in the series (e.g., depending on the traversal) (Step 260). Therefore, in one embodiment, when the user is in Peek mode, the user can pan horizontally to subsequent content items by moving his or her finger 170 or other pointing device in a predetermined direction (e.g., left or right, or up or down) a predetermined number of pixels. In one embodiment, the app 145 then returns to Step 245 and continues monitoring.

As described in more detail below, in one embodiment, the app 145 waits until the user's finger or pointing device has moved a certain number of pixels X-FIRST before the app 145 switches to the first-next photograph left/right, and then uses a smaller number X-SUBSEQUENT to switch to each subsequent photo. If the user's finger or pointing device has moved a significant number of pixels Y up/down before moving X-FIRST left/right, it determines that the user may just be moving his or her finger (or pointing device) out of the way of the photo. In one embodiment, the app 145 increases the value of X-FIRST so that it takes more left/right movement to trigger the initial pan.

Although the predetermined direction is described in this disclosure as being left or right, the predetermined direction can be any direction (e.g., up or down, diagonal left up or diagonal right down, etc.). Further, although an embodiment describes the displaying of the subsequent content item, the displayed content item can be any content item in the series. For example, if the user sets the app 145 to display every other photo upon a swipe, then in one embodiment every other photo is displayed when the predetermined threshold has been met.

In one embodiment, the app 145 or client device 105 further determines a speed of traversal. In one embodiment, in response to the speed, the app 145 or client device 105 controls a speed of display of the subsequent display.

Therefore, the Peek and Pan behavior is indirectly comparable to paging between pieces of full-screen content, except in this embodiment performed by moving one's finger (or pointing device) in a predetermined direction while exerting the required pressure on the screen.

Figure 3A:
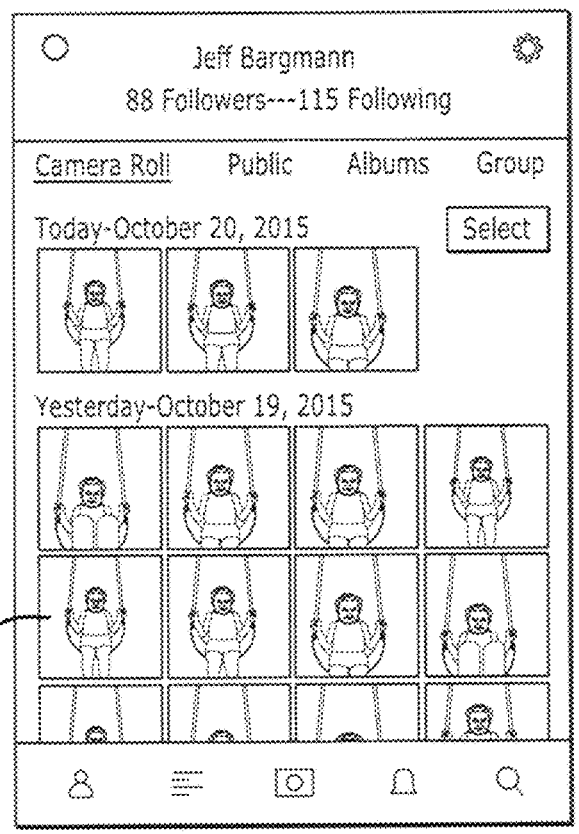
FIGS. 3A-3K are screen shots illustrating the Peek and Pan functionality of the client device of FIG. 1 in accordance with an embodiment of the present disclosure.
Figure 3B:
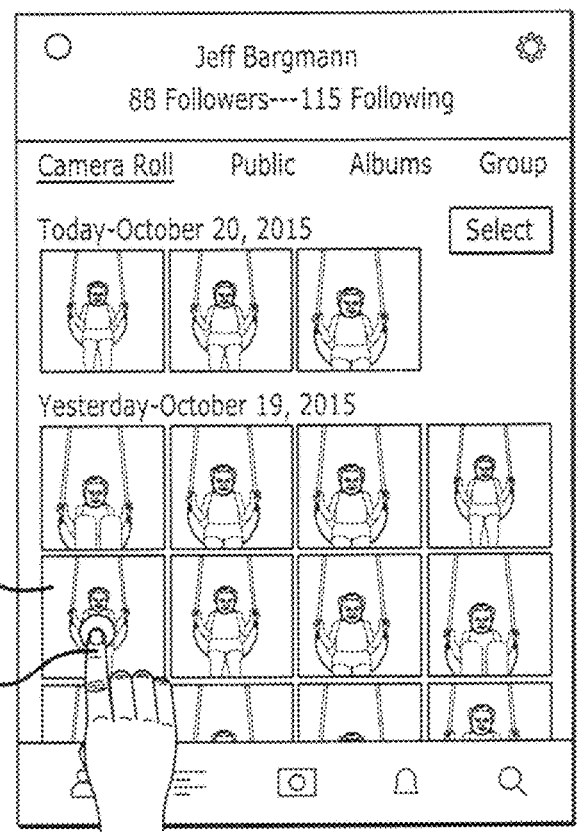
Figure 3C:
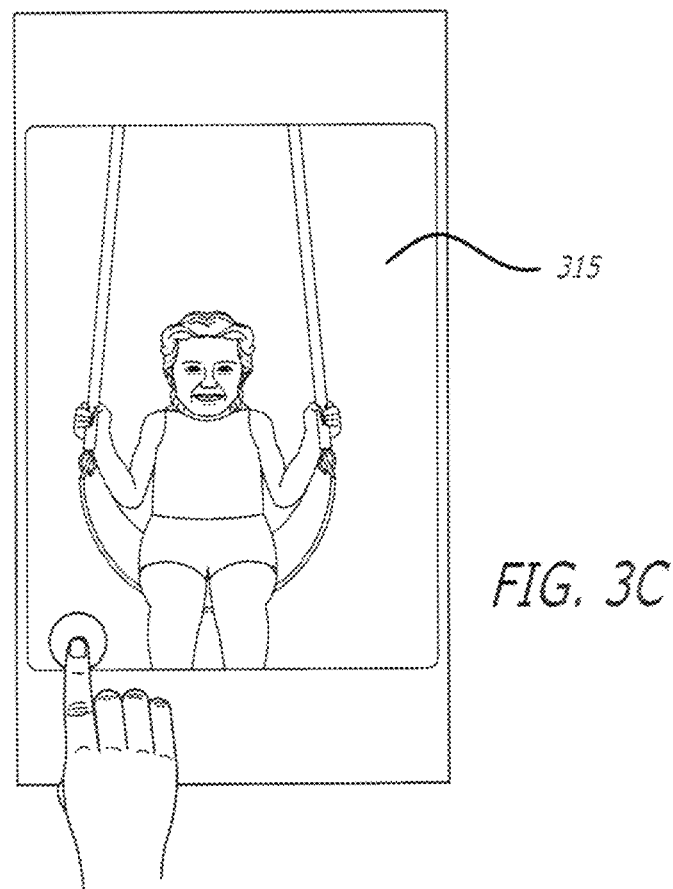

FIG. 3A is an embodiment of a screen shot 300 showing a user's camera roll with many photographs displayed as thumbnails (e.g., thumbnail 305). Referring to FIG. 3B, in one embodiment, the user uses his finger 170 to press on a thumbnail 305 and exert pressure on the screen 160, thereby meeting the required threshold and triggering the "Peek and Pop" functionality. The user's original touch position or touch origin is shown with digital finger 310. FIG. 3C shows an embodiment of a preview 315 of thumbnail 305. As shown, the original touch position or touch origin is still at the same location (or approximately the same location) on the screen 160.

Figure 3D:
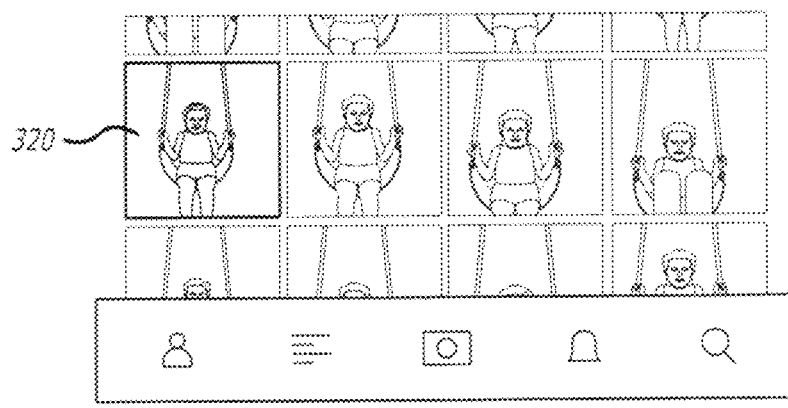
Figure 3E:
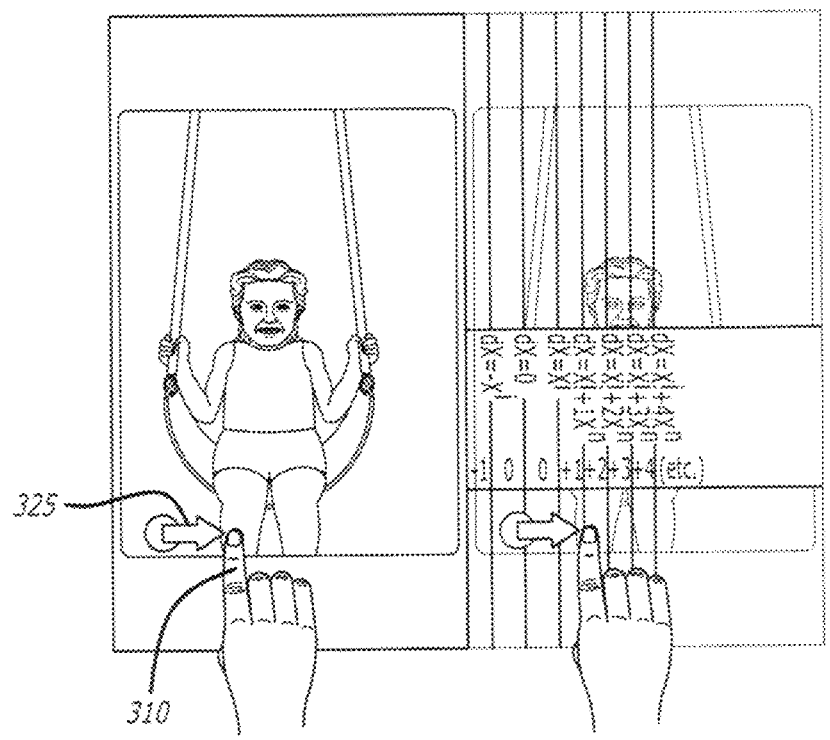

FIG. 3D shows an embodiment of the item 320 the user has chosen to preview. With the user's finger 170 still held on the screen 160, the user moves their finger 170 over $x^{initial}$ units (also referred to below as $X^i$). This is shown in FIG. 3E by the digital finger 310 moving to the right (shown with arrow 325). The preview changes to the next item, allowing the user to browse nearby items. Once $X^i$ units are traversed in either direction from the original touch position, the preview changes to the first corresponding item left or right of the current item 315.

Figure 3F:
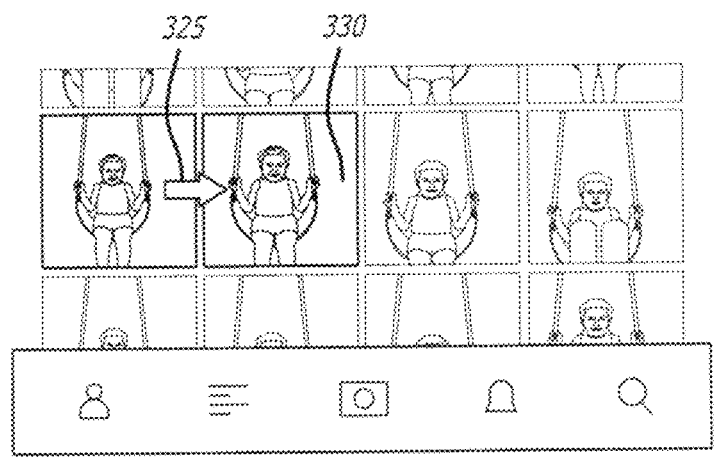
Figure 3G:
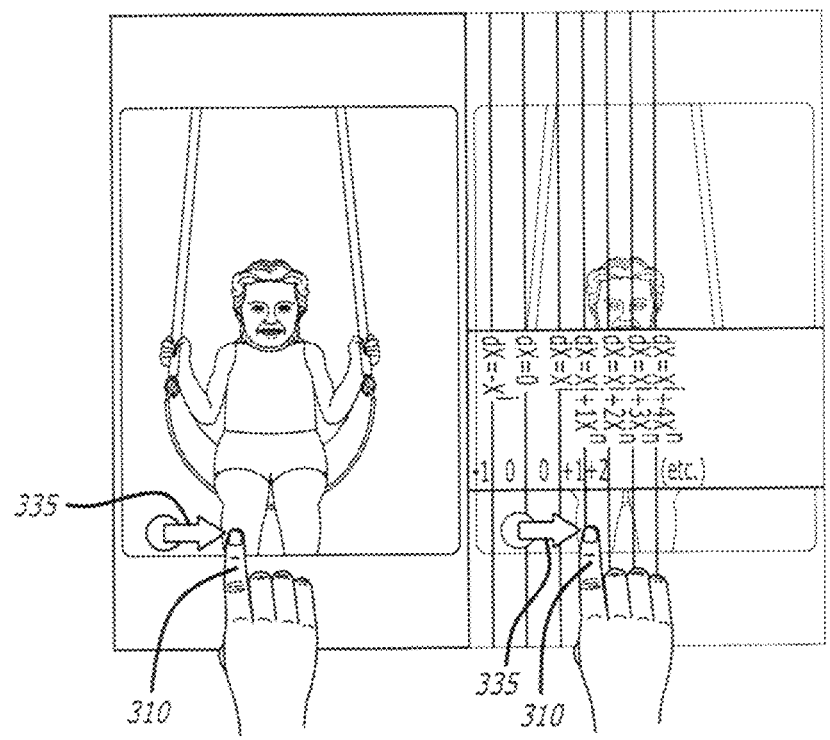

As shown in the embodiment displayed in FIG. 3F, this moves the preview over one item to item 330 corresponding to the direction of the finger's movement 325. The user can continue browsing by moving another $X^{next}$ units in the same direction, also referred to below as $X^n$. As the user's finger continues moving and traverses $(X^i+X^n)$ units from the touch origin, the preview changes to the next subsequent item, and the next subsequent item after that for each subsequent $X^n$ units traversed. This is shown in the embodiment displayed in FIG. 3G, with the digital finger 310 moving the direction shown with arrow 335.

Figure 3H:
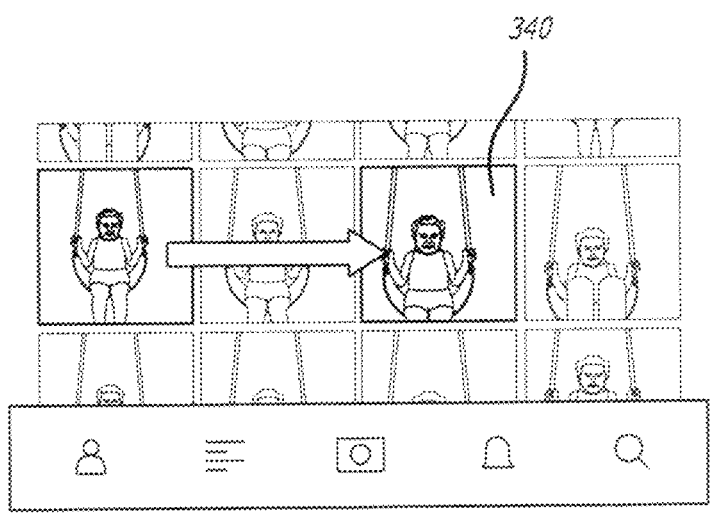

FIG. 3H shows an embodiment of moving the finger into zone +2, thereby changing the preview 340 to +2 items from the original item previewed. Reversing the movement reverses the results of the action (returning the finger to the origin plus/minus $X^i$ returns the preview to the original item).

Figure 3I:
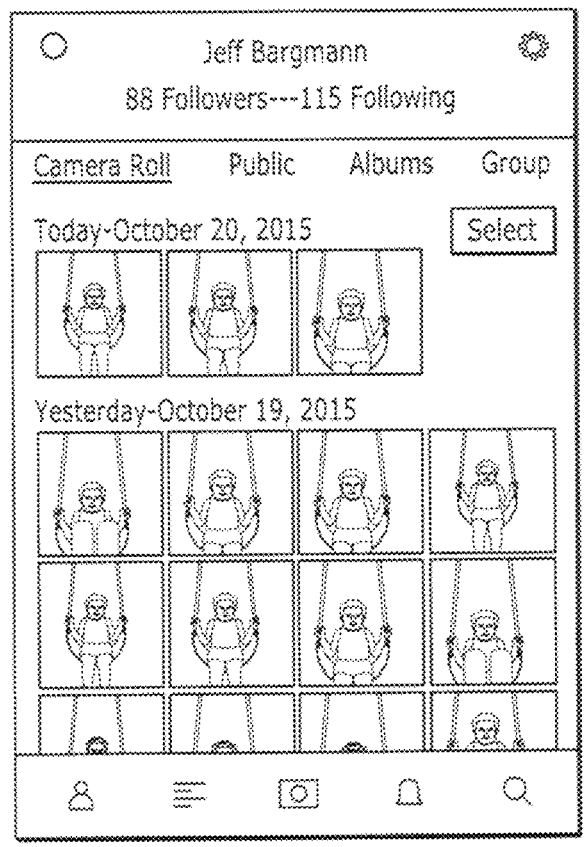

The user releases his finger from the screen 160. The user is returned to the screen they were at before beginning the action, per standard iOS "Peek and Pop" behavior. In one embodiment, and as shown in FIG. 3I, screen 350 is in the identical state they left it. In another embodiment, the screen 350 may have scrolled to ensure the content last in the preview is on-screen.

Figure 3J:
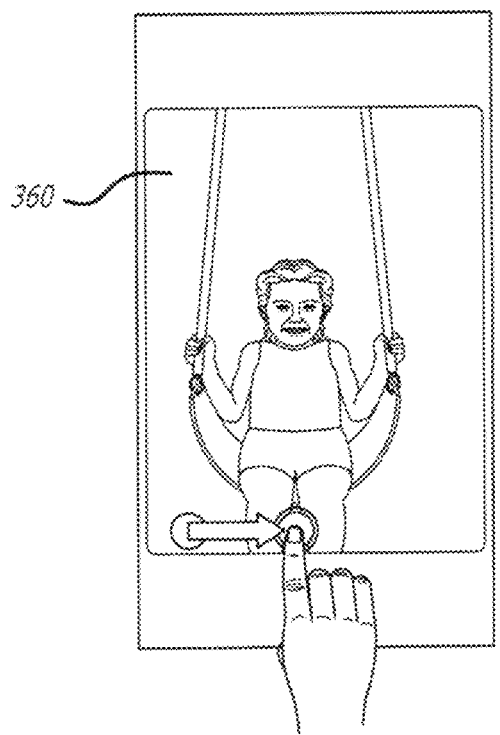

In one embodiment, the user presses harder on the screen, invoking the "Pop" action (also referred to as the "commit" action) of the "Peek and Pop" functionality. Referring to FIG. 3J, per iOS's "Peek and Pop" functionality, the item 360 currently being previewed becomes full-screen. In one embodiment, when the user moves his finger left/right, the user continues to change the item in the full-screen view until the finger is lifted. In other words, in one embodiment, the touch zones and tracking are still active. In another embodiment, moving the finger left/right has no further effect until the user lifts their finger, at which point the gesture is over and typical behavior resumes. In another embodiment, the user may move their finger up/down to trigger an action after committing to full-screen, such as share, like, or favorite.

Figure 3K:
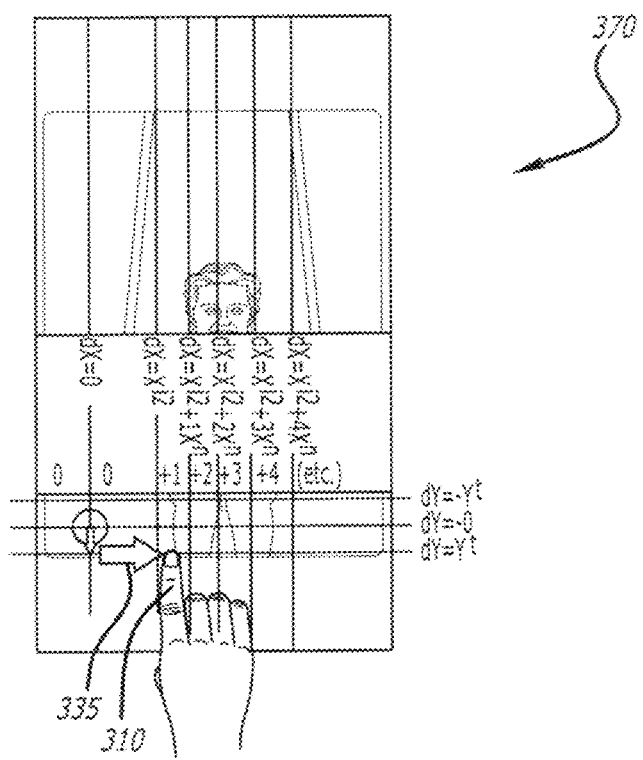

In one embodiment, if $Y^{threshold}$ units (also referred to below as $Y^t$) are traversed in the Y coordinate before $X^i$ units are traversed in the X coordinate, then the value of $X^i$ can be changed to a higher value $X^{i2}$, to increase the threshold for the initial item change. In one embodiment, this occurs because, during "Peek and Pop", the user's finger may be directly over the preview of the item that they are trying to see, and it is foreseeable that the user just wants to move their finger out of the way to see the preview and not change the item being previewed. In this embodiment, the touch zones may be as shown in screen shot 370 of FIG. 3K. In one embodiment, the user's finger has traversed $Y^t$ units from the origin in the Y coordinate before reaching $X^i$ units in the X coordinate, and therefore, a traversal of $X^{i2}$ units in the X coordinate must be reached for the initial change.

As described above, although this disclosure is described with respect to digital photographs, this disclosure can apply to any content item in a series of content items. For example, the Peek and Pan functionality can apply to, e.g., emails, Tweets, text messages, videos, notes, web pages in a web site, blog entries, screens, online comments, a feed, or any thread of communications or content. For instance, if there are several emails in a thread, the user can Peek an email to preview the contents of the email. If the user wants to Pop into the email, the user can press more firmly to view the email. When the user is previewing the email (Peek), the user can swipe left or right to preview the next or previous email in the thread or in the user's inbox or folder.

As another example, suppose a first user sends a link to a website to a second user. The second user can use his client device 105 to Peek at the web site without leaving the screen the second user is on. The app 145 will detect the pressure exerted on the link, and when it reaches the threshold pressure, the top of the web page will be displayed as a preview. The second user can swipe in a predetermined direction to view a subsequent page of the web site (as a preview). If the second user wants to open the full page in a web browser, the second user can press the link a little more "deeply" to Pop into it.

Other examples include paging between stocks in a stock app, or emails in an email app. In another embodiment, this functionality can be used to page more deeply through a single item of content, such as a book in an e-book reading application, a web article in a news-reading app, etc. The user can move his or her finger in a predetermined direction (e.g., right) to "thumb through" the book in the preview or in a table of contents, or scroll down through pages of an email or web article (whether page-at-a-time or in an analog mode). In analog mode, the control would be continuous for every pixel or small group of pixels the finger moves. Thus, by way of non-limiting example, moving 1 pixel would scroll 10% of the screen, moving 5 pixels would scroll 50%, and moving 12 pixels would scroll 1.2 pages down. Further examples of uses could be, e.g., to browse episodes of the pressed TV show in a program guide or TV app, etc. As another example, the functionality herein could be used to explore content in ways tangential to the content itself. For example, in an e-commerce application such as Amazon®, panning right could reveal customer reviews. In a stock market application, pressing and panning could reveal recent company news or graphs, etc.

In one embodiment, this functionality can apply to a photo editing app where the user can tap a filter on and off, or deep press to preview the image with the filter. While the preview is displayed, the user can move his or her finger left or right or any direction to tune the filter in a continuous manner (e.g., after an initial threshold is met), seeing the results live in the preview.

Figure 4:
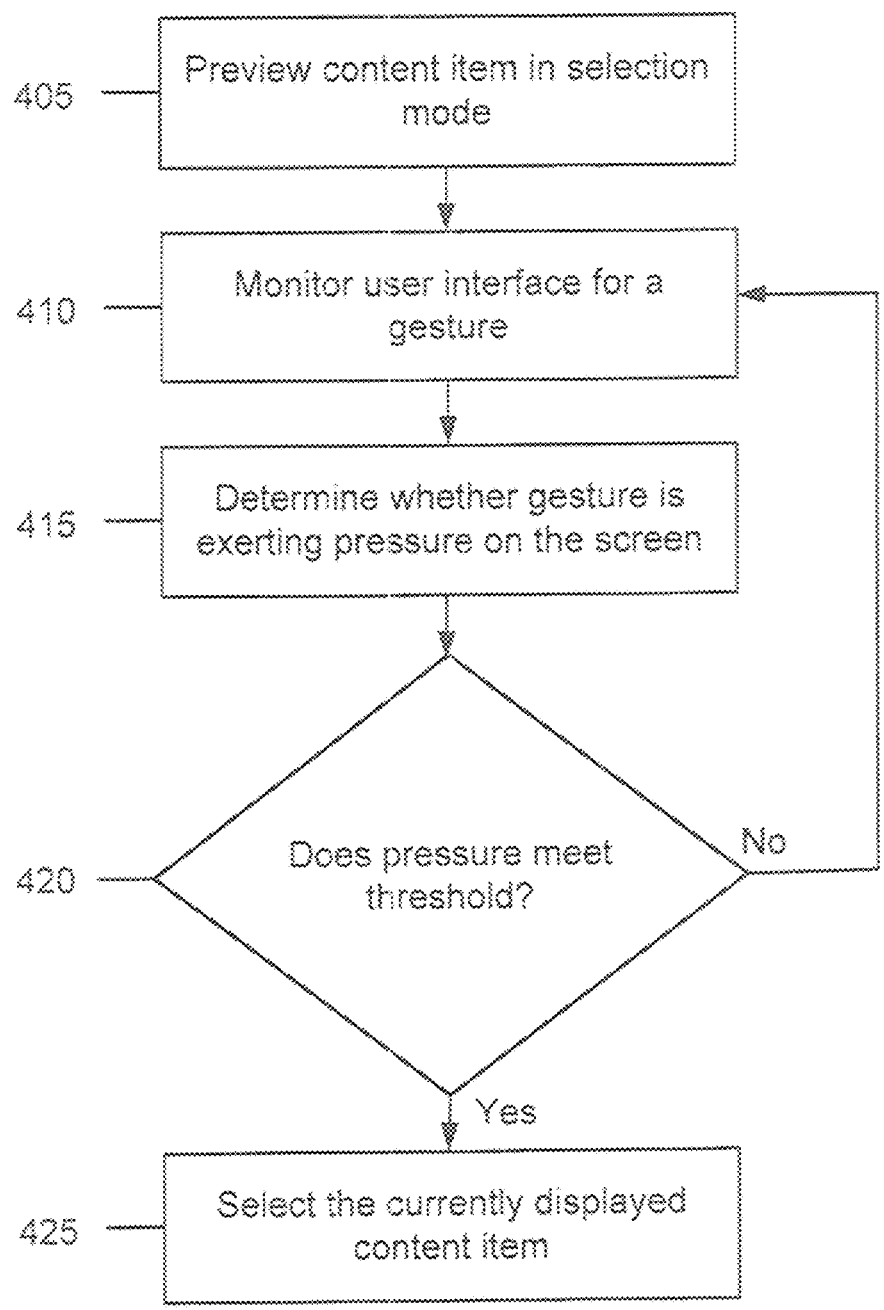
FIG. 4 is a flowchart illustrating steps performed by the client device of FIG. 1 in accordance with an embodiment of the present disclosure.

FIG. 4 shows a flow diagram of an embodiment of additional functionality relating to selection mode of a photo in the app 145. As stated above, the app 145 can preview the content item (e.g., photo). When in a selection mode (Step 405), the app 145 can monitor the user interface for a gesture (Step 410). The client device 105 determines whether the gesture is exerting pressure on the screen 160 (Step 415). If so, the client device 105 (the app 145) determines whether the pressure meets a selection threshold (Step 420). If not, the app 145 returns to Step 410.

If so, the app 145 can select the currently displayed photo (e.g., places a check mark next to the photo) (Step 425) instead of displaying the previewed content full-screen. In one embodiment, the photo may be brought on to the screen 160 if it is off-screen.

Thus, in selection-mode, "popping" (i.e., pressing firmly while the preview is displayed) will, in one embodiment, select the currently displayed photo instead of the typical behavior of making the preview-content be displayed full-screen. At the time of the deep press, in one embodiment the preview will disappear, but when returned to the main screen the user will discover the item has been selected, and in one embodiment an animation (e.g., a bounce animation) will play on the selected item to call attention to the action that has been performed on it.

The selection threshold can be set, similar to the thresholds described above, by the user, by the client device, by the server, etc.

In the existing "Peek and Pop" behavior, when a preview is further deep pressed and committed to the screen, the available options are typically 1) "Pop"ing the preview to full-screen or 2) dismissing the preview with no other effects.

Figure 5A:
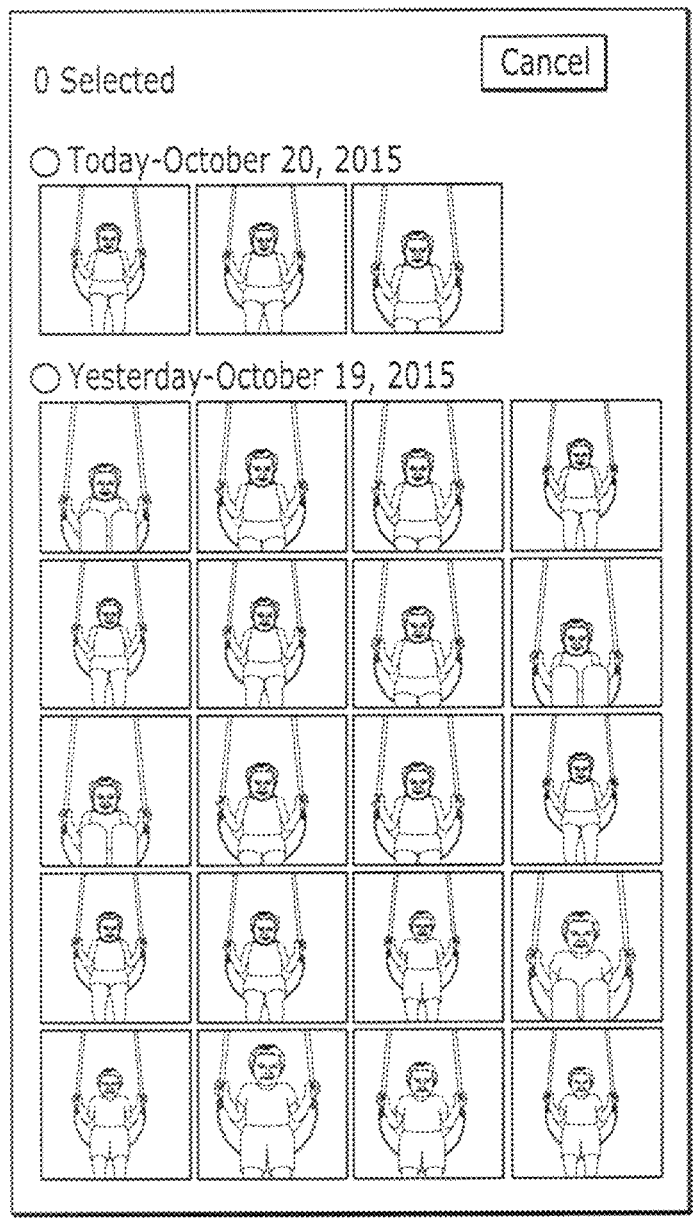
FIGS. 5A-5D are screen shots illustrating the selection mode functionality of the client device of FIG. 1 in accordance with an embodiment of the present disclosure.
Figure 5B:
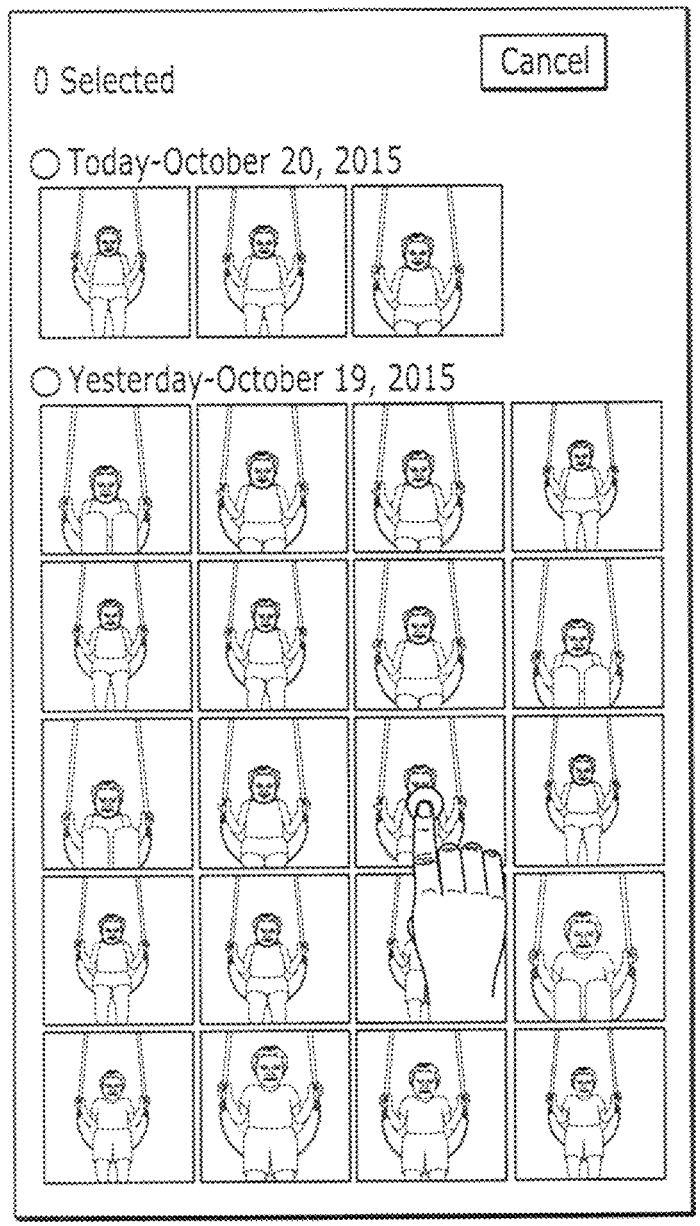

FIG. 5A shows a screen shot 500 in which the user is in selection mode. In one embodiment, the user begins iOS "Peek and Pop" operation by "3D Pressing" deeply on an item of interest (see an embodiment as shown in screen shot 510 of FIG. 5B). The client device 105 requests a preview for the touched content to display in a preview.

Figure 5C:
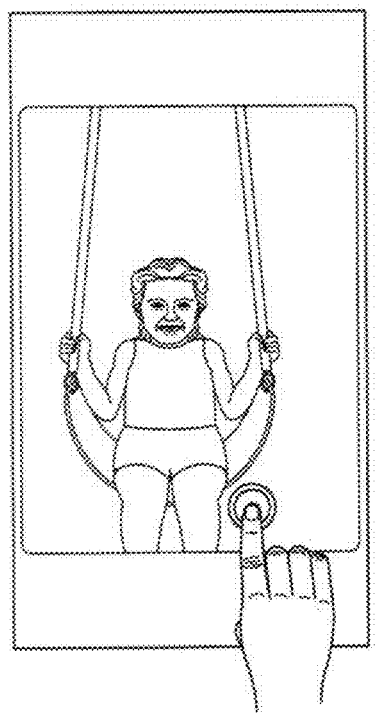
Figure 5D:
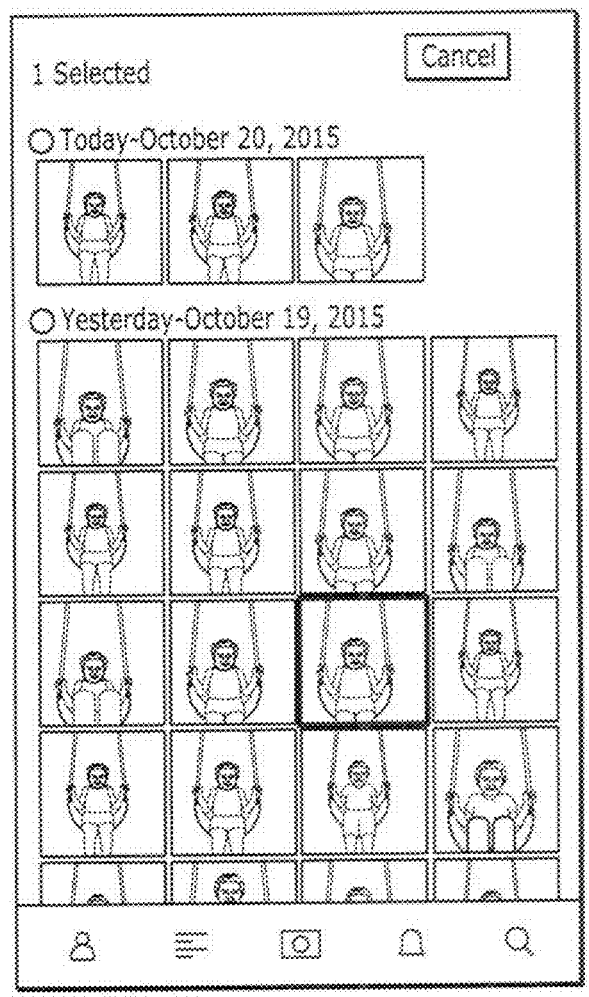

In one embodiment, the preview is displayed on screen 160. The user then presses harder on the screen 160, invoking the "Pop" or "commit" action of iOS's "Peek and Pop" functionality (shown in screen shot 520 of FIG. 5C). The preview is dismissed, and the user is returned to the original screen, with the item currently displayed in the preview now selected (as shown in FIG. 5D, screen shot 530). An animation may be played on the item to indicate an action that has been performed on to the item. If the item currently displayed is off-screen on the original screen, the original screen may be scrolled to bring the item on screen.

Thus, this functionality can be utilized with the functionality described above, as without the functionality described with respect to FIGS. 4 and 5A-5C, it would be difficult to select an item in selection mode after identifying it with the description identified above (e.g., with respect to FIGS. 1-3K). For example, one may have panned to an arbitrary item which is not the item originally touched (i.e., the item whose position is known to the user). If the user were to release their finger, or if they were to press more firmly and the preview were to just dismiss, they would need to re-locate the item they were previewing to perform the typical selection action. This item, however, may even be off the screen or look very similar at a small size (e.g., thumbnail) to other items, creating a significant challenge to the user. With this embodiment, the user can easily select any item panned to in the Peek and Pan functionality.

Further, this selection mode functionality can function independently. In this embodiment, the item being previewed becomes selected upon pressing more firmly per the "Pop" part of the Peek and Pop. This is different than the typical behavior in the typical iOS Photos app, where "Pop"ing while in select mode dismisses the preview and has no effect.

Figure 6:
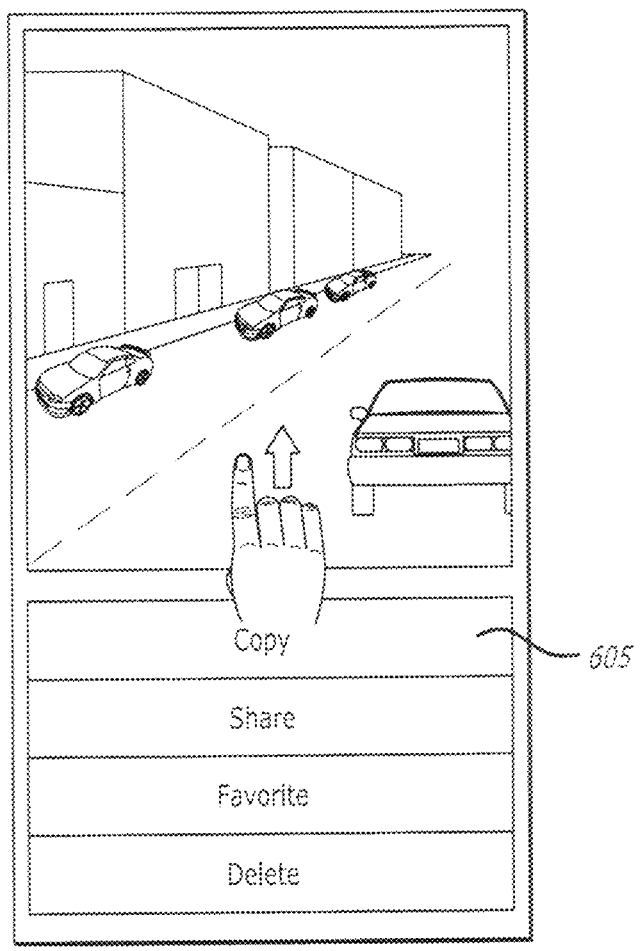
FIG. 6 is a screen shot illustrating functionality of the client device of FIG. 1 in accordance with an embodiment of the present disclosure.

In some versions of iOS, moving the finger significantly upward in the Y coordinate can trigger a menu to be pulled up from the bottom of the screen 160. This menu can contain any items as defined by an application, such as "Share" and "Delete". This is shown in FIG. 6 with menu 605.

In this embodiment, all panning activity described above (Peek and Pan) may be suspended while the menu is currently active. The activation of this menu can be detected by a notification from the app (e.g., from the operating system), by observing the state of the underlying view structure on the screen 160, or by detecting movement beyond a certain Y coordinate threshold above the original touch position.

Upon the menu hiding (or returning below the threshold, etc.), so long as the user's finger or pointing device is still pressed on the screen, normal panning should resume as described above. The preview may stay at the current item until a new X threshold is passed since the revoking of the menu. In another embodiment, the new X threshold can be 0, in which case the Peek and Pan functionality would immediately resume, and the preview would change to the item indicated by the corresponding zone the user's finger is in, as described above.

Figure 7:
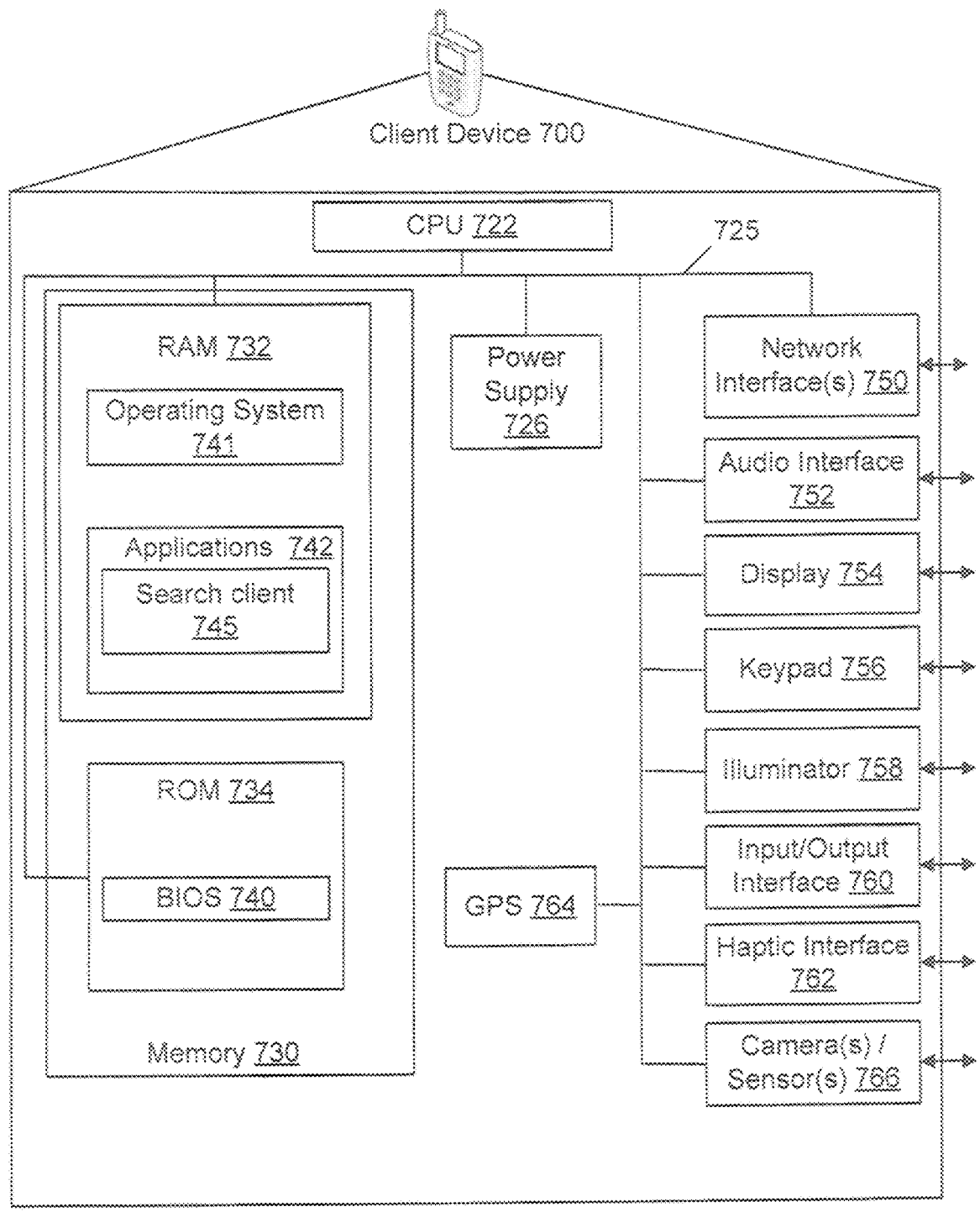
FIG. 7 is a schematic diagram illustrating a client device in accordance with an embodiment of the present disclosure.

Exemplary pseudocode for the above Peek and Pan functionality (including the expansion of the original-item touch zone) and the selection mode functionality is shown below:

FIG. 7 is a schematic diagram illustrating a client device showing an example embodiment of a client device that may be used within the present disclosure. Client device 700 may include many more or less components than those shown in FIG. 7. However, the components shown are sufficient to disclose an illustrative embodiment for implementing the present disclosure. Client device 700 may represent, for example, client device discussed above in relation to FIG. 1.

As shown in the figure, Client device 700 includes a processing unit (CPU) 722 in communication with a mass memory 730 via a bus 725. Client device 700 also includes a power supply 726, one or more network interfaces 750, an audio interface 752, a display 754, a keypad 756, an illuminator 758, an input/output interface 760, a haptic interface 762, an optional global positioning systems (GPS) receiver 764 and a camera(s) or other optical, thermal or electromagnetic sensors 766. Device 700 can include one camera/sensor 766, or a plurality of cameras/sensors 766, as understood by those of skill in the art. The positioning of the camera(s)/sensor(s) 766 on device 700 can change per device 700 model, per device 700 capabilities, and the like, or some combination thereof.

Power supply 726 provides power to Client device 700. A rechargeable or non-rechargeable battery may be used to provide power. The power may also be provided by an external power source, such as an AC adapter or a powered docking cradle that supplements and/or recharges a battery.

Client device 700 may optionally communicate with a base station (not shown), or directly with another computing device. Network interface 750 includes circuitry for coupling Client device 700 to one or more networks, and is constructed for use with one or more communication protocols and technologies as discussed above. Network interface 750 is sometimes known as a transceiver, transceiving device, or network interface card (NIC).

Audio interface 752 is arranged to produce and receive audio signals such as the sound of a human voice. For example, audio interface 752 may be coupled to a speaker and microphone (not shown) to enable telecommunication with others and/or generate an audio acknowledgement for some action. Display 754 may be a liquid crystal display (LCD), gas plasma, light emitting diode (LED), or any other type of display used with a computing device. Display 754 may also include a touch sensitive screen arranged to receive input from an object such as a stylus or a digit from a human hand.

Keypad 756 may comprise any input device arranged to receive input from a user. For example, keypad 756 may include a push button numeric dial, or a keyboard. Keypad 756 may also include command buttons that are associated with selecting and sending images. Illuminator 758 may provide a status indication and/or provide light. Illuminator 758 may remain active for specific periods of time or in response to events. For example, when illuminator 758 is active, it may backlight the buttons on keypad 756 and stay on while the client device is powered. Also, illuminator 758 may backlight these buttons in various patterns when particular actions are performed, such as dialing another client device. Illuminator 758 may also cause light sources positioned within a transparent or translucent case of the client device to illuminate in response to actions.

Client device 700 also comprises input/output interface 760 for communicating with external devices, such as a headset, or other input or output devices not shown in FIG. 7. Input/output interface 760 can utilize one or more communication technologies, such as USB, infrared, Bluetooth™, or the like. Haptic interface 762 is arranged to provide tactile feedback to a user of the client device. For example, the haptic interface may be employed to vibrate client device 700 in a particular way when the Client device 700 receives a communication from another user.

Optional GPS transceiver 764 can determine the physical coordinates of Client device 700 on the surface of the Earth, which typically outputs a location as latitude and longitude values. GPS transceiver 764 can also employ other geopositioning mechanisms, including, but not limited to, triangulation, assisted GPS (AGPS), E-OTD, CI, SAI, ETA, BSS or the like, to further determine the physical location of Client device 700 on the surface of the Earth. It is understood that under different conditions, GPS transceiver 764 can determine a physical location within millimeters for Client device 700; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 730 includes a RAM 732, a ROM 734, and other storage means. Mass memory 730 illustrates another example of computer storage media for storage of information such as computer readable instructions, data structures, program modules or other data. Mass memory 730 stores a basic input/output system ("BIOS") 740 for controlling low-level operation of Client device 700. The mass memory also stores an operating system 741 for controlling the operation of Client device 700. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 730 further includes one or more data stores, which can be utilized by Client device 700 to store, among other things, applications 742 and/or other data. For example, data stores may be employed to store information that describes various capabilities of Client device 700. The information may then be provided to another device based on any of a variety of events, including being sent as part of a header during a communication, sent upon request, or the like. At least a portion of the capability information may also be stored on a disk drive or other storage medium (not shown) within Client device 700.

Applications 742 may include computer executable instructions which, when executed by Client device 700, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 742 may further include search client 745 that is configured to send, to receive, and/or to otherwise process a search query and/or search result using any known or to be known communication protocols. Although a single search client 745 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 8:
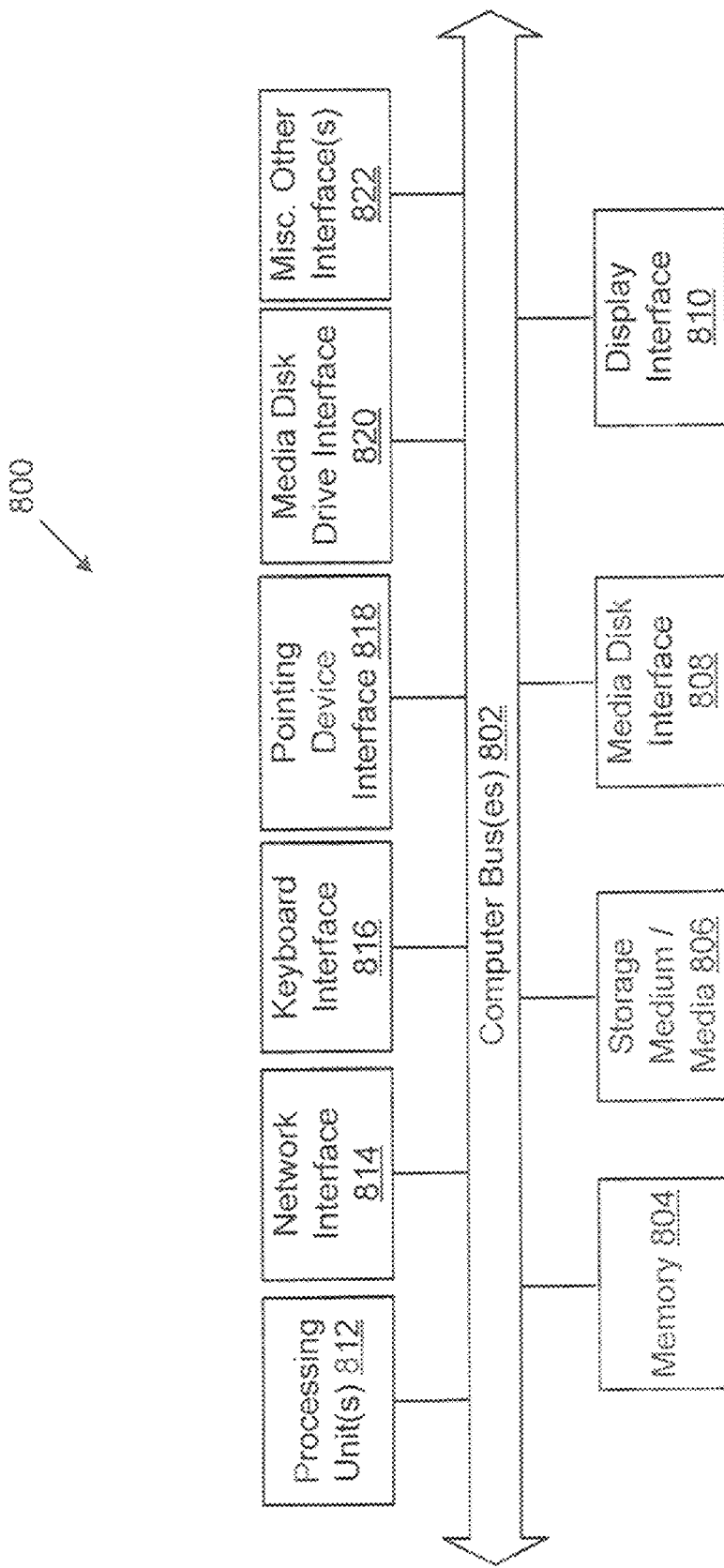
FIG. 8 is a block diagram illustrating an internal architecture of a computer in accordance with an embodiment of the present disclosure.

As shown in FIG. 8, internal architecture 800 of a computing device(s), computing system, computing platform and the like includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces 822 not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure.

A network link typically provides information communication using transmission media through one or more networks to other devices that use or process the information. For example, the network link may provide a connection through a local network to a host computer or to equipment operated by a Network or Internet Service Provider (ISP). ISP equipment in turn provides data communication services through the public, worldwide packet-switching communication network of networks now commonly referred to as the Internet.

A computer called a server host connected to the Internet hosts a process that provides a service in response to information received over the Internet. For example, server host hosts a process that provides information representing video data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. A module, or software components of a module, may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Figure 9A:
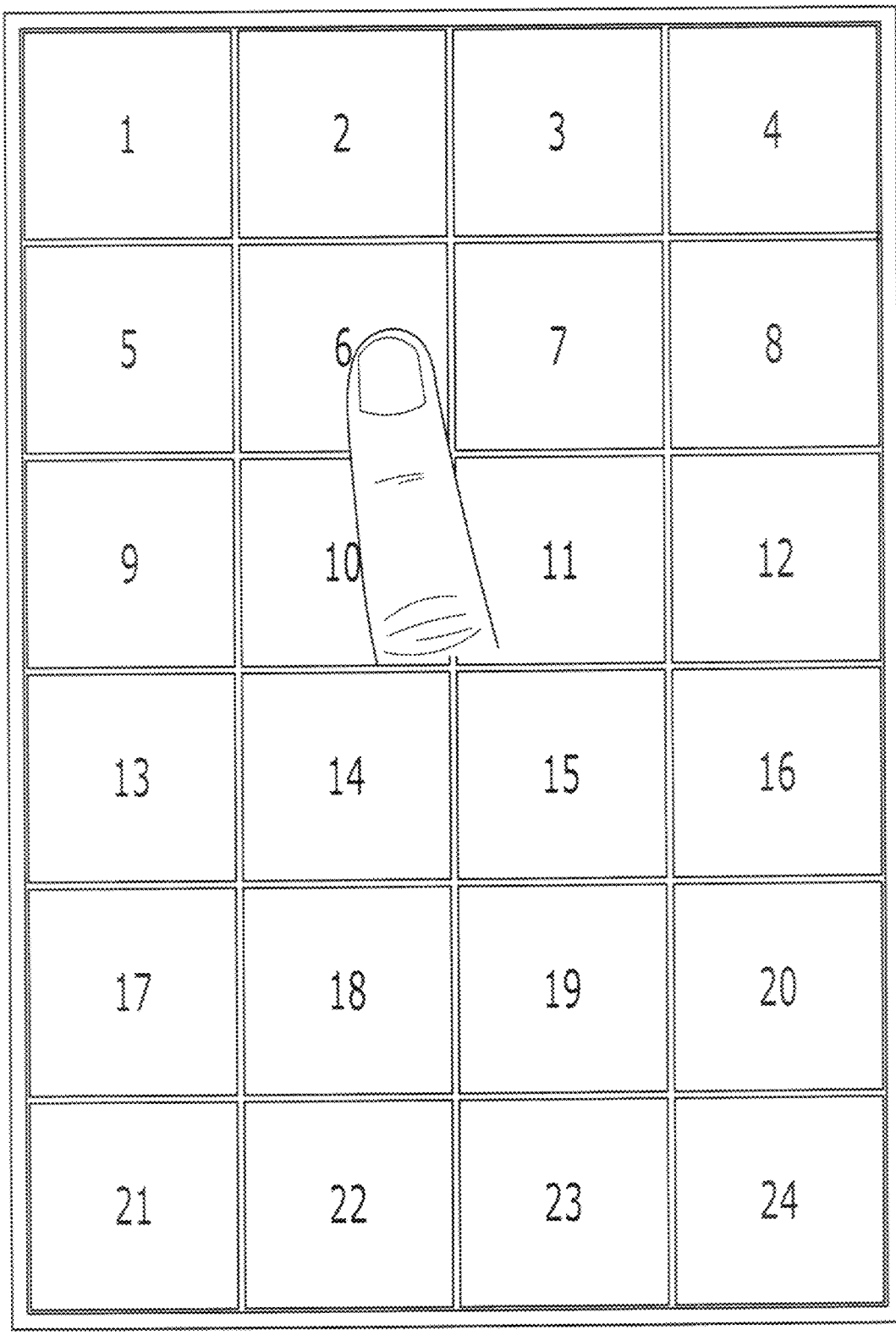
FIGS. 9A-9E are screen shots illustrating the Peek and Pan functionality of the client device of FIG. 1 in accordance with an embodiment of the present disclosure.
Figure 9B:
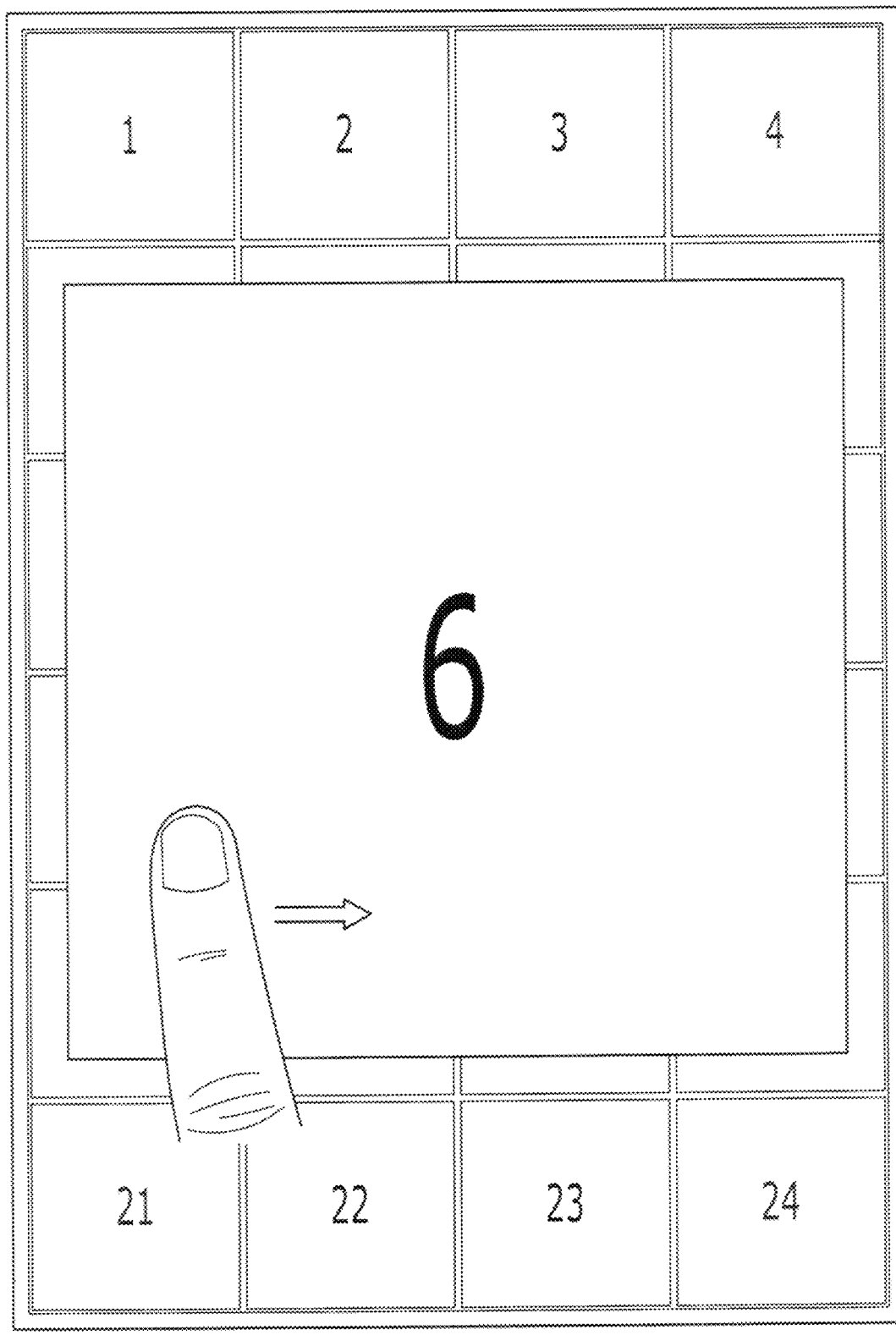
Figure 9C:
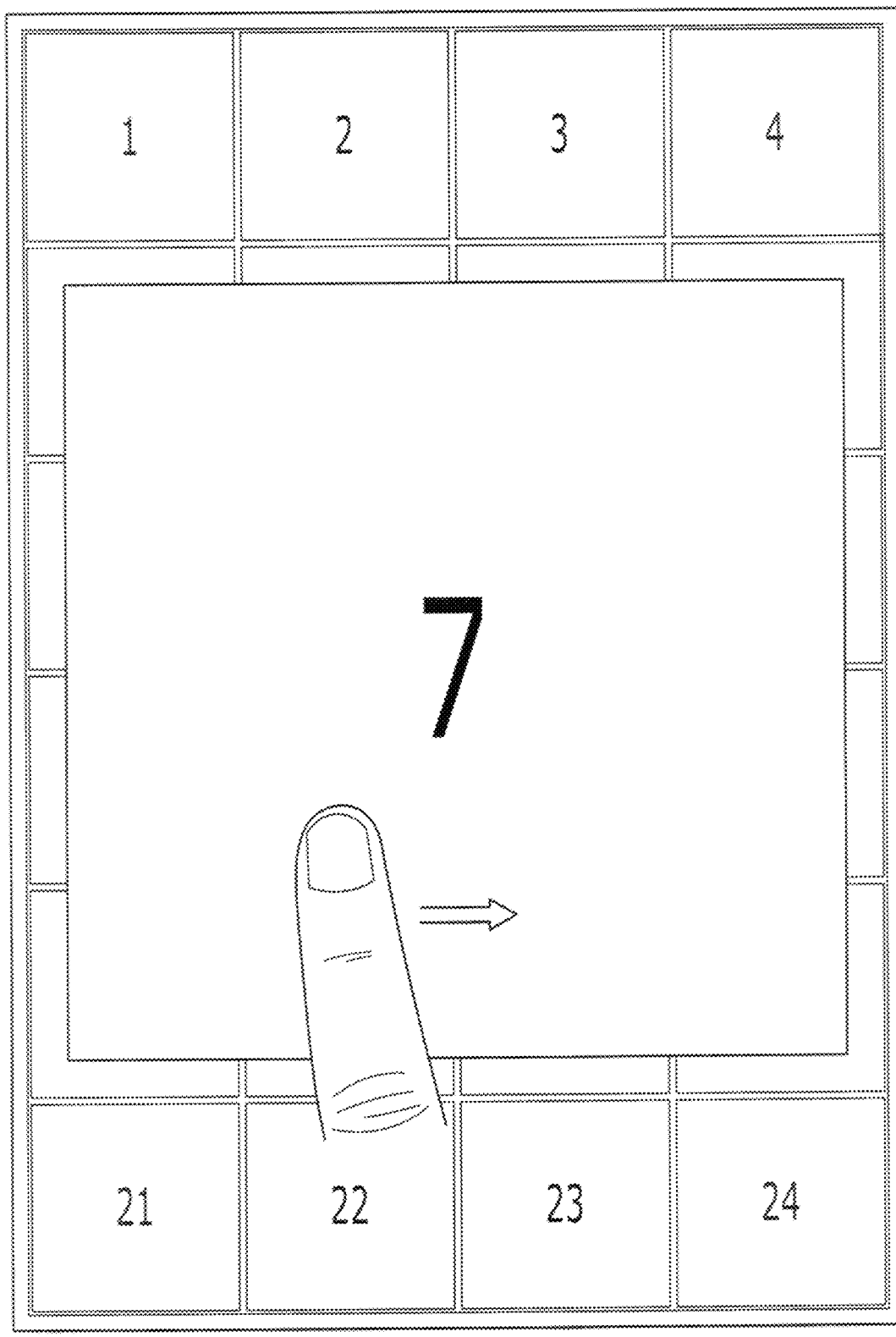
Figure 9D:
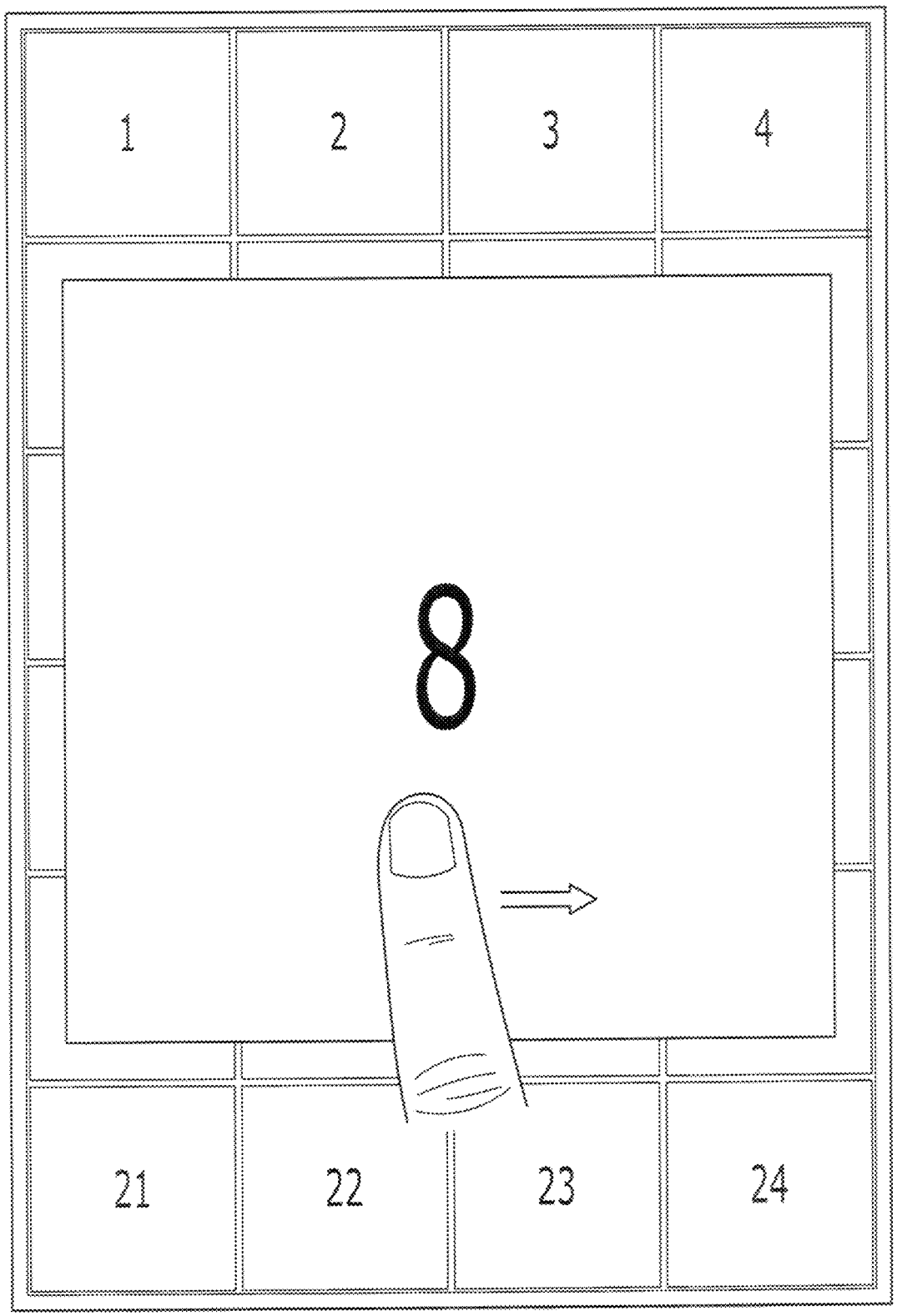
Figure 9E:
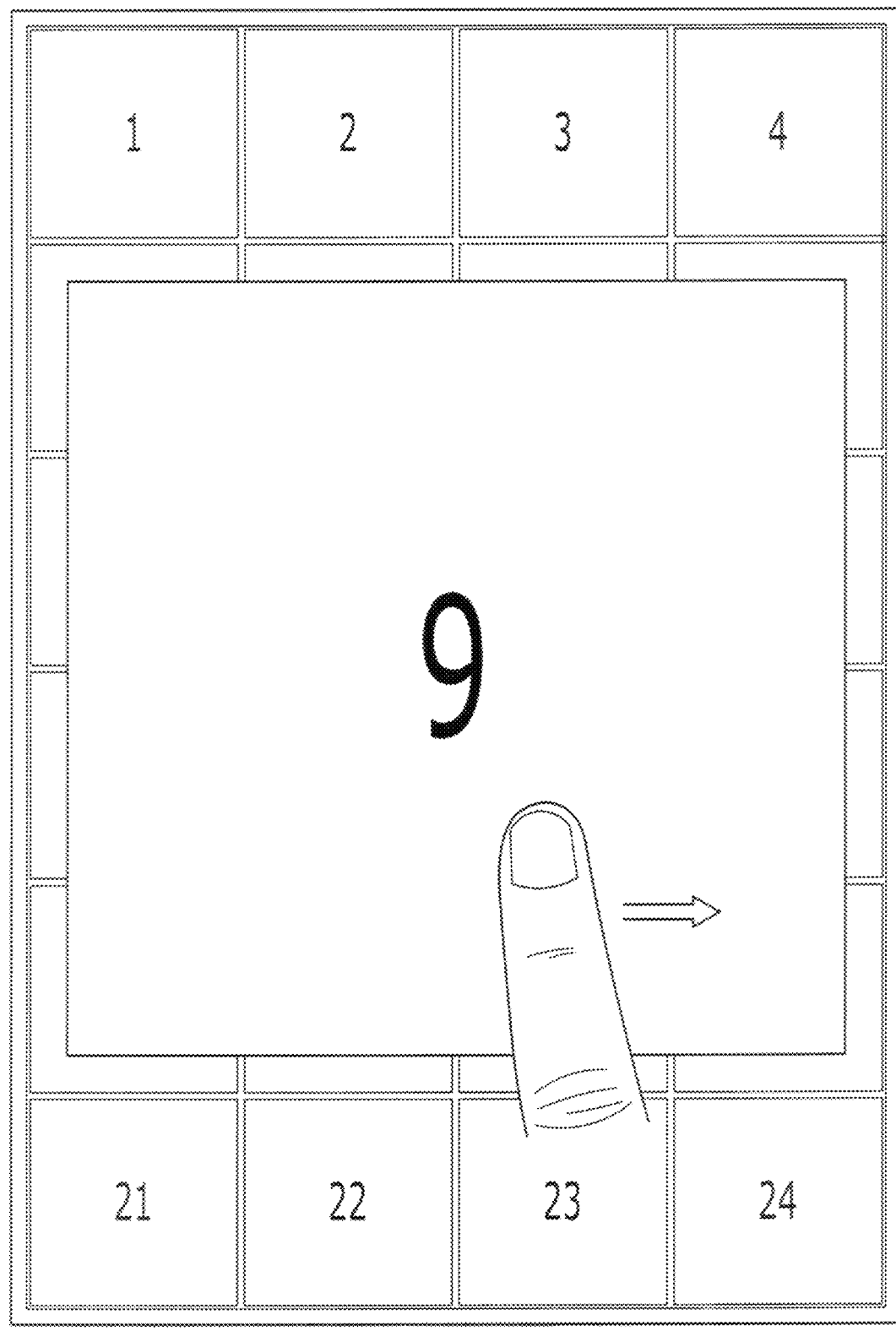

FIGS. 9A-9E are screen shots illustrating the Peek and Pan functionality of the client device of FIG. 1 in accordance with an embodiment of the present disclosure. These figures show a display screen with a grid of 24 content items of any type described herein. In FIG. 9A, the user's finger presses on content item 6. FIG. 9B shows the Peek functionality, where the user previews the content item 6. The user then "Pans" or traverses pixels to preview, e.g., adjacent content, such as content item 7 (FIG. 9C), content item 8 (FIG. 9D), and content item 9 (FIG. 9E). In another embodiment, at the end of the traversal, the user can continue to preview the content item (e.g., content item 9) or can transition back to the grid of content items.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
monitoring, by a processor of a computing device, a user interface for a gesture;
identifying, by the processor, based on said monitoring, said gesture, said gesture corresponding to a content item displayed within said user interface;
identifying, via the processor, a set of content items associated with the content item identified by said gesture;
determining, by the processor, whether the gesture comprises exerting pressure on a touch screen of the computing device;
when the gesture is exerting pressure on the screen, determining, by the processor, whether the pressure is above a threshold amount of pressure;
when the pressure is above the threshold amount of pressure, providing, by the processor, an interactive preview of the identified content item and the identified set of content items, said interactive preview comprising an interface element displayed within the user interface that displays an initial display of the identified content item;
further monitoring, by the processor, the user interface for a second gesture;
identifying, via the processor, based on said further monitoring, said second gesture;
determining, by the processor, whether the second gesture is traversing pixels in a direction and at an angle respective to a predetermined direction on the touch screen respective to the interactive preview of the identified content item;
determining, by the processor, that the angle respective to the predetermined direction of the second gesture is greater than an angular traversal threshold associated with the predetermined direction;
increasing, by the processor, based on the determination that the angle of the second gesture is greater than the angular traversal threshold, a value of a pixel traversal threshold so that it takes additional pixel traversal beyond an original value of the pixel traversal threshold to trigger the display of a subsequent content item;
upon determining that an amount of pixels traversed by the second gesture in the direction and at the angle respective to the predetermined direction meets or exceeds the increased value of the pixel traversal threshold, determining a speed of the second gesture's traversal; and
modifying, via the processor, the interactive preview displayed within the interface element to remove the display of the identified content item and subsequently display within the interface element each of the content items in said set of content items at a rate corresponding to said second gesture's speed.

2. The method of claim 1, further comprising when the traversal meets a further pixel traversal threshold, displaying a further subsequent content item.

3. The method of claim 1, wherein the content items are selected from a group consisting of: photographs, images, email strings, text messages, tweets, videos, notes, web pages, blog entries, screens, online comments, a feed, event timelines, and media items.

4. A computing device comprising:
a processor; and
a non-transitory computer-readable storage medium for tangibly storing thereon program logic for execution by the processor, the program logic comprising:
logic executed by the processor for monitoring a user interface for a gesture;
logic executed by the processor for identifying, based on said monitoring, said gesture, said gesture corresponding to a content item displayed within said user interface;
logic executed by the processor for identifying a set of content items associated with the content item identified by said gesture;

logic executed by the processor for determining whether the gesture comprises exerting pressure on a touch screen of the computing device;

logic executed by the processor for determining, when the gesture is exerting pressure on the screen, whether the pressure is above a threshold amount of pressure;

logic executed by the processor for providing, when the pressure is above the threshold amount of pressure, an interactive preview of the identified content item and the identified set of content items, said interactive preview comprising an interface element displayed within the user interface that displays an initial display of the identified content item;

logic executed by the processor for further monitoring the user interface for a second gesture;

logic executed by the processor for identifying based on said further monitoring, said second gesture;

logic executed by the processor for determining whether the second gesture is traversing pixels in a direction and at an angle respective to a predetermined direction on the touch screen respective to the interactive preview of the identified content item;

logic executed by the processor for determining that the angle respective to the predetermined direction of the second gesture is greater than an angular traversal threshold associated with the predetermined direction;

logic executed by the processor for increasing, based on the determination that the angle of the second gesture is greater than the angular traversal threshold, a value of a pixel traversal threshold so that it takes additional traversal beyond an original value of the pixel traversal threshold to trigger the display of a subsequent content item;

logic executed by the processor for determining, upon determining that an amount of pixels traversed by the second gesture in the direction and at the angle respective to the predetermined direction meets or exceeds the increased value of the pixel traversal threshold, a speed of the second gesture's traversal; and logic executed by the processor for modifying the interactive preview displayed within the interface element to remove the display of the identified content item and subsequently display within the interface element each of the content items in said set of content items at a rate corresponding to said second gesture's speed.

5. The computing device of claim 4, further comprising logic executed by the processor for, when the traversal meets a further pixel traversal threshold, displaying a further subsequent content item.

6. The computing device of claim 4, wherein the content items are selected from a group consisting of: photographs, images, email strings, text messages, tweets, videos, notes, web pages, blog entries, screens, online comments, a feed, event timelines, and media items.

7. A non-transitory computer readable storage medium tangibly storing thereon computer-executable instructions, that when executed by a processor of a computing device, perform a method comprising:

monitoring a user interface for a gesture;

identifying based on said monitoring, said gesture, said gesture corresponding to a content item displayed within said user interface;

identifying a set of content items associated with the content item identified by said gesture;

determining whether the gesture comprises exerting pressure on a touch screen of the computing device;

when the gesture is exerting pressure on the screen, determining whether the pressure is above a threshold amount of pressure;

when the pressure is above the threshold amount of pressure, providing an interactive preview of the identified content item and the identified set of content items, said interactive preview comprising an interface element displayed within the user interface that displays an initial display of the identified content item;

further monitoring the user interface for a second gesture;

identifying based on said further monitoring, said second gesture;

determining whether the second gesture is traversing pixels in a direction and at an angle respective to a predetermined direction on the touch screen respective to the interactive preview of the identified content item;

determining that the angle respective to the predetermined direction of the second gesture is greater than an angular traversal threshold associated with the predetermined direction;

increasing, based on the determination that the angle of the second gesture is greater than the angular traversal threshold, a value of a pixel traversal threshold so that it takes additional pixel traversal beyond an original value of the pixel traversal threshold to trigger the display of a subsequent content item;

upon determining that an amount of pixels traversed by the second gesture in the direction and at the angle respective to the predetermined direction meets or exceeds the increased value of the pixel traversal threshold, determining a speed of the second gesture's traversal; and modifying the interactive preview displayed within the interface element to remove the display of the identified content item and subsequently display within the interface element each of the content items in said set of content items at a rate corresponding to said second gesture's speed.

* * * * *